United States Patent [19]

Anderson et al.

[11] Patent Number: 4,821,034

[45] Date of Patent: Apr. 11, 1989

[54] DIGITAL EXCHANGE SWITCH ELEMENT AND NETWORK

[75] Inventors: Terry M. Anderson, Minnetonka; Robert S. Cornelius, Edina, both of Minn.

[73] Assignee: Ancor Communications, Inc., Minneapolis, Minn.

[21] Appl. No.: 11,842

[22] Filed: Feb. 6, 1987

[51] Int. Cl.$^4$ .................. H04Q 11/04; H04Q 1/00; H04J 3/00

[52] U.S. Cl. .................. 340/825,800; 370/63; 379/271

[58] Field of Search ........... 340/825.8, 825.83, 825.03; 370/59, 63, 64, 54, 58; 379/220, 221, 268, 284, 271-273

[56] References Cited

U.S. PATENT DOCUMENTS

| | | | |
|---|---|---|---|
| 4,162,375 | 7/1979 | Schlichte | 370/59 |
| 4,425,640 | 1/1984 | Philip et al. | 370/64 |
| 4,546,468 | 10/1985 | Christmas et al. | 370/54 |
| 4,569,043 | 2/1986 | Simmons et al. | 370/63 |
| 4,725,835 | 2/1988 | Schreiner et al. | 340/825.83 |

*Primary Examiner*—Donald J. Yusko
*Attorney, Agent, or Firm*—Merchant, Gould, Smith, Edell, Welter & Schmidt

[57] ABSTRACT

A method and apparatus for a multi-channel space-division switching network capable of providing dedicated line connections from a large number of inlets to a large number of outlets for either analog or digital communication. A flexible and highly modular space-division switching network is constructed using a basic digital exchange circuit element. This element is a basic building block which can be inexpensively manufactured and wired together in large numbers to form space-division switching networks which can be expanded or contracted according to a user's requirements and volume of communications. The building block element is constructed using line receiver/driver buffers as an interface to adapt a wide variety of communications media to the internal electronic media of the space-division switching network. The element also includes bus driver/receivers which are used to transfer communication information to and from intrastage and interstage buses. Input communication information is placed on these communication buses and N-line to 1-line multiplexers remove the communication information from the buses and transfer it to the communication destination. In a multi-stage design, a plurality of I/O buses, transfer buses and crossover buses are used in conjuction with a plurality of N-line to 1-line multiplexers to select a nonblocking communication path from a requesting port to a destination port. Control of the multiplexers and data transfer throughout the communication network is accomplished by means of distributive processing in microprocessors placed at various stages throughout the network. The microprocessors communicate with one another to forward communications requests by means of a serial communications bus.

20 Claims, 13 Drawing Sheets

STANDARD CONFIGURATION
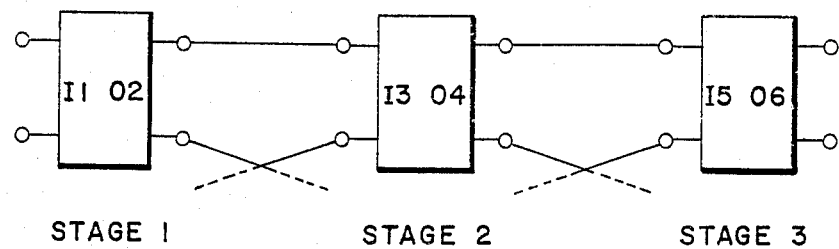
FIG. 5A
FOLDED CONFIGURATION
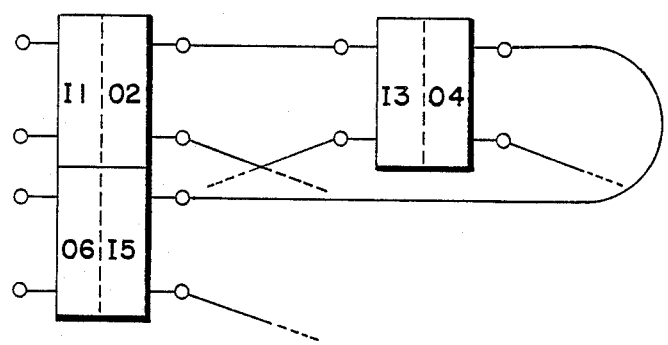
FIG. 5B
NEW CONFIGURATION (CONCEPTUAL)
FIG. 5C
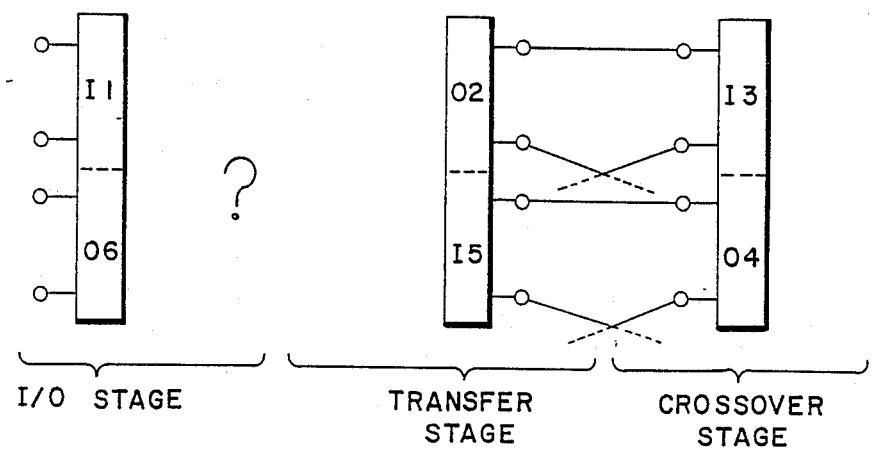

DIGITAL EXCHANGE CIRCUIT ELEMENT

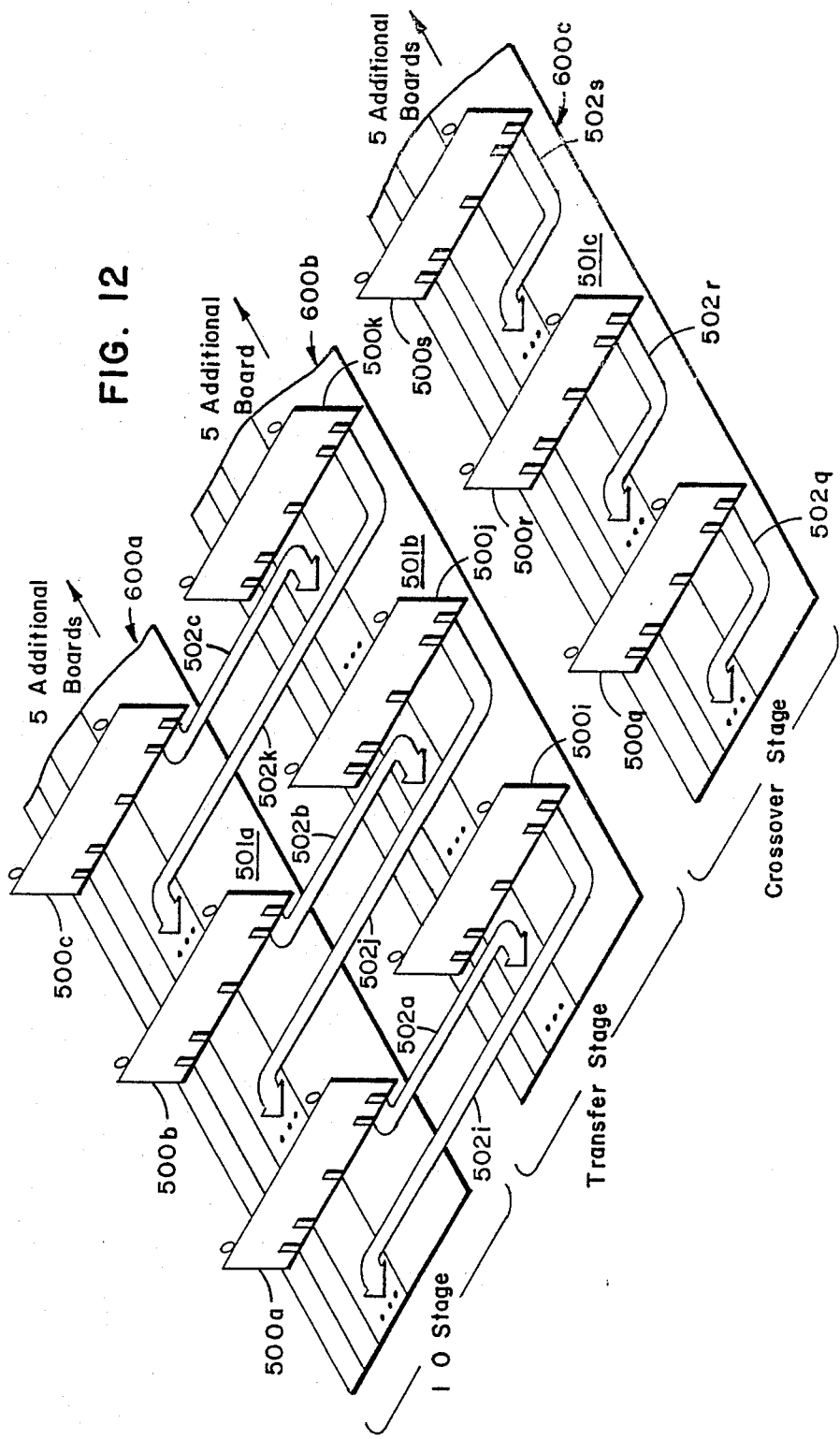

DIGITAL EXCHANGE SWITCH ELEMENT AND NETWORK

FIELD OF THE INVENTION

The present invention relates to information exchange and communications networking. In particular, the present invention relates to a method and system for passing analog or digital information from one of a large number of sources to any one of a large number of destinations through the use of space-division switching.

BACKGROUND OF THE INVENTION

All communications networks have followed one of two broad development paths. The first path is represented by the work of the telephone industry and the second path is represented by the work of the computer industry. The terminology used to describe the communications networks and the switching theory associated therewith may be slightly different when working within one of the two domains. For purposes of clarity, the description of the present invention and the description of the background of the invention will use the language of telephony.

In telephone terms, there are three basic elements of a communications network: terminals, transmission media, and switches. Terminals are the input and output equipment which attach users of the network to the network equipment. Transmission media include wire cables, coaxial cables, fiber optic cables, microwaves, and a variety of other media. The switch is the device that makes the network function by providing connections between the various terminals by way of the transmission media.

Within the realm of switching as a technique for interconnect there are two broad classifications of method: time division switching and space division switching. Time division switching involves the sharing of a single transmission medium by multiple users who have access to the medium during different periods of time. Time division multiplexers provide a sequence of time slots during which individual sources can transmit and during which individual destinations can receive. Time division switching is accomplished by selecting appropriate pairings of input time slots to output time slots so as to connect willing correspondents.

Space division switching is based on the sharing of multiple transmission paths. A space-division switch provides a private transmission path between an input and an output that is set up on request, used exclusively by the correspondents, and then released. Space division switching allows many different forms of communication to be carried on over the transmission path, since space division switching is relatively indifferent to the kind of use that is being made of a connection. In contrast to this, time division switching requires clock synchronization, common data formats, and common transmission speeds on the shared link.

The first space division switches were implemented in the telephone industry as crossbar switches. A typical crossbar switch is a crosspoint array of M×N conductors where the intersections of conductors formed crosspoint switches. This switching matrix can be used to connect any one of the quantity (M) inlets to any one of the quantity (N) outlets. An inlet is connected directly to an outlet through a single crosspoint connection. The crosspoints of the crossbar switch were originally mechanical contacts that were operated by magnets in order to set up and hold the connection. Today it is common to find the crosspoints implemented with computer logic elements taking the place of mechanical contacts and magnets.

One of the disadvantages of the crossbar switch is that an excessive number of crosspoints (M×N) are required to implement a large switch. The largest switches which are typically used in the telephone industry are on the order of 300 crosspoints in a space division switch. Designers have learned, however, that one way to improve the effectiveness of crossbar switching is to combine crossbar assemblies into multi-stage designs. This strategy was developed in 1952 by Charles Clos of Bell Laboratories for sizing the various crossbar assemblies to effect a most effecient usage of crossbars in large designs and is well known to those skilled in the art.

Even using multi-stage designs for a space domain switch, the number of crosspoints needed to implement large designs continued to be excessively large. Eliminating the number of crosspoints caused other problems such as reducing the traffic-carrying capabilities of the system and increasing the effect of component failures on comunications through the system. Limiting the number of crosspoints in a multi-stage design also caused blocking problems when the number of users increased beyond a limited capacity of the multi-stage switch.

SUMMARY OF THE INVENTION

The present invention describes very large space-division switching network based on an elementary digital exchange circuit element and a method for handling communications therethrough. The digital exchange circuit element is constructed by connecting a line receiver to a bus driver, a plurality of bus receivers to N-line to 1-line multiplexer under microprocessor control, and a line driver to the output of the multiplexer. The line driver/receiver buffers may be of a wide variety of interface buffers to adapt the space-domain switching network to the type of communications used by the customer, such as fiber optic, differential line, etc. The bus drivers/receivers of the digital exchange circuit element are used to transfer information along intrastage and interstage communications buses to other digital exchange circuit elements where the N-line to 1-line channel multiplexers may select the information for transmission to the receiver. Microprocessors connected to the N-line to 1-line multiplexers are used to control the switching network using distributed processing and control structure.

The method of transfering communications information through the digital exchange switch element involves the use of microprocessors to scan incoming lines for access requests by transmitting users. When a request is received by a microprocessor, the microprocessor sends an acknowledging signal to the requester and the requester transmits a digital dialing string containing the address of the destination port that the user wishes to transmit to. The receiving microprocessor then attempts to find a free channel throughout the network to reach the destination port. If the destination port is busy, or if no free channels are found to that port, the microprocessor instructs the requesting user that the network is busy or a free channel cannot be found. If the connection from the requesting port to the destination port is found, the transmission path is fixed for communication and the microprocessor of the requesting digital exchange circuit element is freed to service requests by other users of other ports. A wide variety of protocols may be used for dialing, connection and disconnection of requesting ports to destination ports. Simplex or duplex communications based either in analog or digital techniques may be used throughout this network.

Very large space-domain switching networks may be constructed in multi-stage designs. A typical multi-stage design is implemented using an I/O stage, a transfer stage, and a crossover stage constructed of a plurality of subassemblies, each of which being also constructed from a plurality of digital exchange circuit elements. Each subassembly is modular in design and can be substituted for other subassemblies throughout all of the stages. Each subassembly has a plurality of digital exchange circuit elements connected to each of the other digital exchange circuit elements within the subassembly by means of a multi-channel bus. Each N-line to 1-line multiplexer of each digital exchange circuit within each subassembly can select any one of the channels of the multi-channel bus within each subassembly. The plurality of subassemblies in the I/O stage are connected to the plurality of subassemblies in the transfer stage by connecting each bus driver of each digital exchange circuit element of each subassembly of the I/O stage to one channel of the multi-channel bus of the subassemblies of the transfer stage. The transfer stage is connected in like manner to the I/O stage in that each bus driver of each digital exchange circuit element of each subassembly of the transfer stage is wired to one channel of the multi-channel bus within the subassemblies of the I/O stage. The crossover stage performs a unique function in that it allows communication between subassemblies of the transfer stage, which in turn allows a complete connection capability of any port in the I/O stage to any other port in the I/O stage. The crossover stage is constructed by folding back on itself. That is, each bus driver of each digital exchange circuit element of the subassemblies of the crossover stage are wired to an individual dedicated channel of the multi-channel buses within subassemblies of the crossover stage. The final connection between the transfer stage and the crossover stage completes the large space-division switching network. This is accomplished by connecting each available line driver of each digital exchange circuit element of each subassembly within the transfer stage to a unique, individual line receiver of each digital exchange circuit element of the crossover stage. In a paired fashion, each line driver of each digital exchange circuit element of each subassembly of the crossover stage is wired to a unique line receiver of a unique digital exchange circuit element of the subassemblies of the transfer stage. At least one microprocessor is contained in each subassembly and controls all of the digital exchange circuit element N-line to 1-line multiplexers within that subassembly. All of the various microprocessors in the various subassemblies communicate with one another through a serial communications control bus. Each microprocessor performs a forwarding function on a local basis to receive communications requests and transfer those requests in an attempt to find an open communication path from a user port inlet to a user port outlet. Microprocessors also handle the handshaking protocol between the user's telecommunications equipment attached to the ports and the space-division switching network.

By constructing digital exchange circuit elements, digital exchange switching subassemblies, and digital exchange switching racks in a modular fashion, very large space-division switching networks can be constructed. The modularity of its construction provides for a space-division switching network which can expand with the user's needs for more communications channels and to improve traffic handling capabilities. Space-division switching networks on the order of 4,096 inlets × 4,096 outlets are capable using this technique.

The foregoing and other objects and advantages of the present invention over the prior art will become known to those skilled in the art upon reading and understanding the following descriptions.

DESCRIPTION OF THE DRAWINGS

In the drawings, where like numerals refer to like components throughout the several views.

FIGS. 5a through 5c present the conceptual reconfiguration of a multi-stage switching network. FIG. 5a shows the standard configuration, FIG. 5b shows a folded configuration wherein the inlets and outlets are arranged adjacent one another. FIG. 5c shows the new configuration of the present invention on a conceptual level as it relates to the traditional space switch.

FIG. 12 is a partial perspective view of three digital exchange connector boards (racks) of the type shown in FIG. 11 partially interconnected.

DETAILED DESCRIPTION OF THE PRIOR ART

Figure 1:
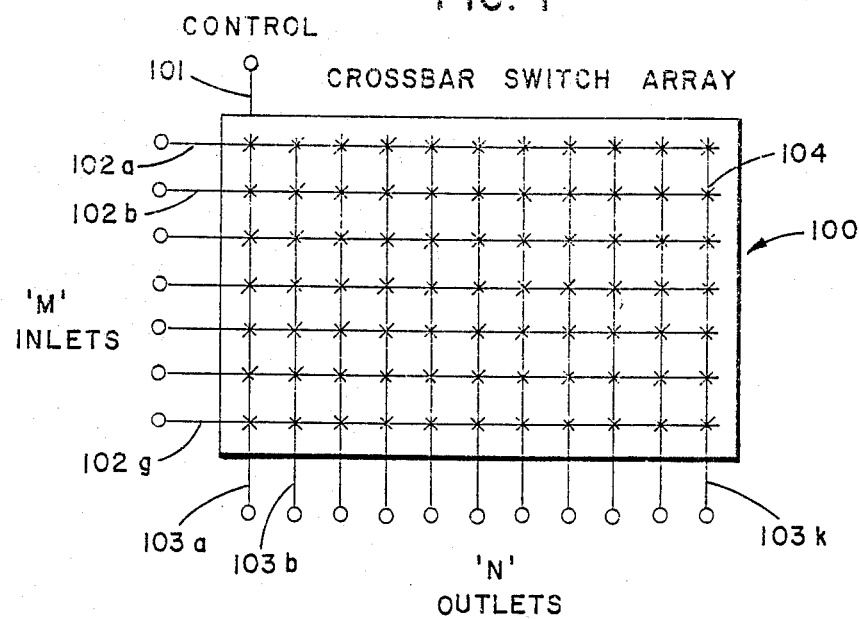
FIG. 1 shows a typical prior art crossbar switch having M×N crosspoints.

A typical prior art space division switch is shown in FIG. 1 as a crossbar switch. The switching matrix 100 can be used to connect any one of the quantity (M) inlets 102a–102g to any one of the quantity (N) outlets 103a–103k. An inlet is connected directly to an outlet through a single crosspoint 104. The crosspoints 104 of the crossbar switch 100 were originally mechanical contacts that were operated by magnets in order to set up and hold the connection. Today it is common to find the crosspoints implemented with computer logic elements taking the place of mechanical contacts and magnets.

FIG. 1 also shows a control element 101 extending into the switch 100. The control element is the device that receives requests for connection in some manner and then closes and opens the crosspoints to activate and deactivate the desired connection. The nature and workings of the control element of these prior art switches is not described in detail but is well known in the prior art. In order to reduce the complexity of the presentation, the control element is omitted from the prior art devices described herein. The exact techniques required to control crossbar switches such as the type shown in FIG. 1 are well known to those skilled in the art.

Figure 2:
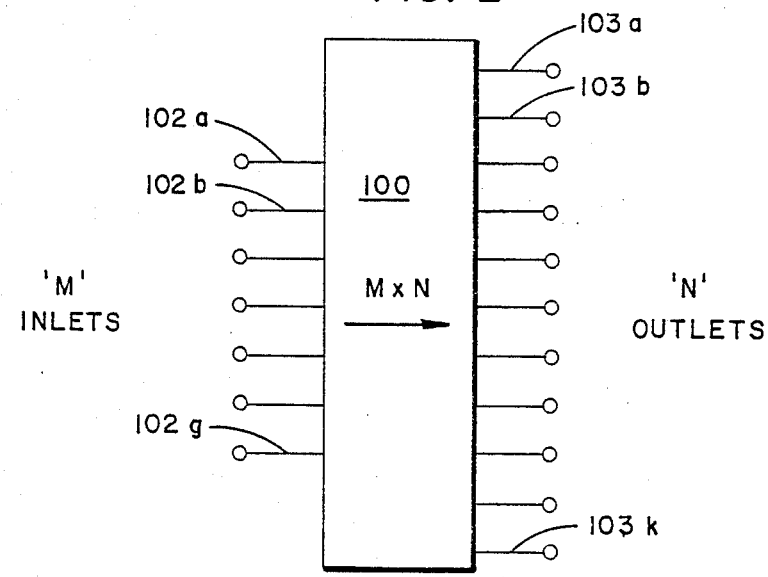
FIG. 2 is a functional block representative of a typical prior art M×N crossbar assembly.

FIG. 2 is a simplified representation of the crossbar switch shown in FIG. 1. The crossbar assembly shown in FIG. 2 represents a crossbar switch 100 with quantity (M) inlets 102a–102g and quantity (N) outlets 103a–103k, as indicated by the notation M×N. The direction from inlet to outlet is indicated by the arrow. This shorthand notation will be used in the more complex drawings of the discussion of prior art which follows.

Figure 3:
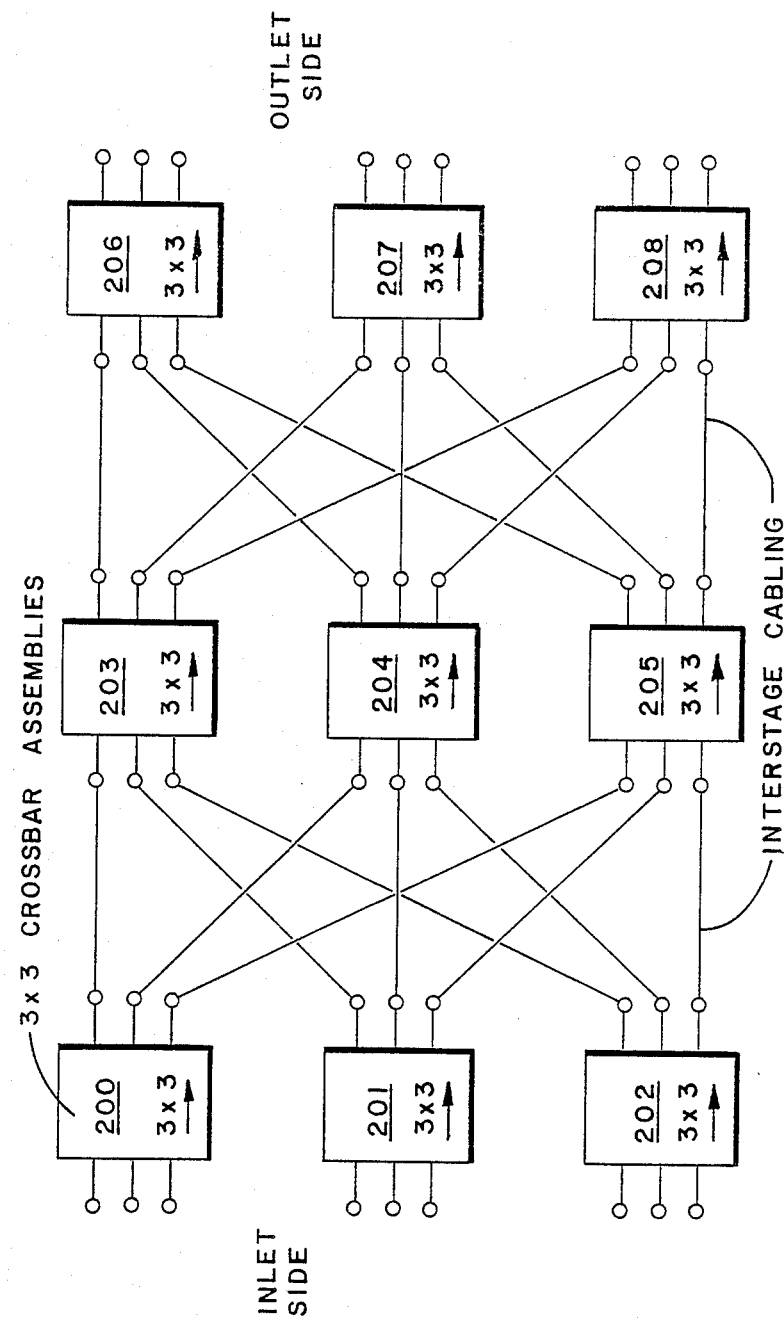
FIG. 3 depicts a three-stage switching matrix for a 9×9 switch using a plurality of 3×3 crossbar assemblies.

One of the disadvantages of the crossbar switch is that an excessive number of crosspoints (M×N) are required to implement a large space switch. Designers have learned, however, that one way to improve the effectiveness of crossbar switching is to combine crossbar assemblies to multi-staged designs. FIG. 3 is an example of one such multi-staged design. The switching matrix shown in FIG. 3 uses a plurality of 3×3 crossbar assemblies to connect 9 inlets to 9 outlets. The interconnect of the stages is done so that each of the three outlets of a single crossbar assembly connects to a different crossbar assembly of the succeeding stage, and each of the three inlets of a single crossbar assembly connect to a different crossbar assembly of the preceding stage. This method of interconnect is typical of the prior art multi-stage switches. Crossbar assemblies 200, 201, 202 form the first stage, crossbar assemblies 203, 204, 205 form the second stage, and crossbar assemblies 206, 207, 208 form the third stage of the multi-stage crossbar assembly space switch shown in FIG. 3. Nine 3×3 crossbar assemblies are used to produce a 9×9 crossbar switch, which appears to be an inefficient method of construction for such a small switch. The real benefits of multi-stage switching appear in larger design structures.

Figure 4:
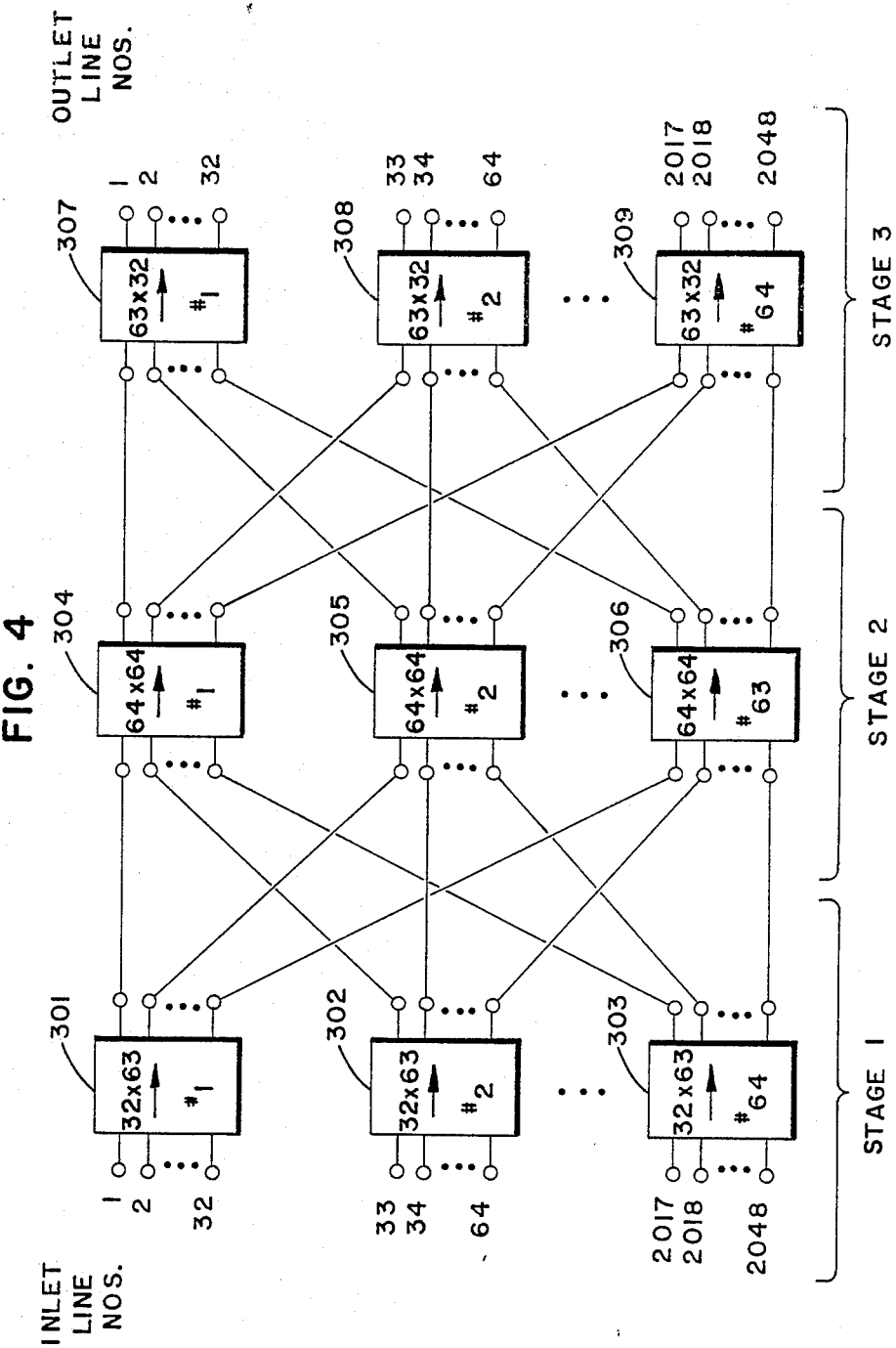
FIG. 4 shows a three-stage switching matrix for a 2048×2048 switch using individual crossbar assemblies sized for optimal performance.

FIG. 4 is a more typical multi-staged crossbar switch implementation. The space switch in FIG. 4 connects 2048 inlets to 2048 outlets using 64 crossbar assemblies for stage 1, 63 crossbar assemblies for stage 2, and 64 crossbar assemblies for stage 3. FIG. 4 depicts only a few of the crossbar assemblies but the general method of construction is the same as that described for FIG. 3. A strategy was developed in 1952 by Charles Clos of Bell Laboratories for sizing the various crossbar assemblies, and the design shown in FIG. 4 is one which meets the Clos criteria.

The three-stage design shown in FIG. 4 has several advantages over a single-stage design of equivalent size. First and foremost is that by sharing the use of crosspoints in the middle section, the total number of crosspoints required for equivalent service is reduced from over 4,000,000 to about 500,000 in this instance. A second significant benefit is that by virtue of this sharing of the middle section crosspoints, multiple paths exist between any inlet point and any outlet point. This multiple routing capability allows the switch to work around localized incidences of failures.

The designers of the three-stage switch also noticed that they could vary the number of paths through the middle section of the switch shown in FIG. 4 all the way from one extreme, in which there are a very limited number of connections, to the other extreme, in which there are a surplus number of possible connections. The prior art designers reasoned that not all users of the switch would have occasion to use it simultaneously and that it should therefore not be necessary to provide paths through the switch for simultaneous use. On the other hand, it is possible to provide more than full capability so that the traffic-carrying ability of the switch is not diminished by a few component failures. These differing approaches result in a different number of crosspoints, and therefore a different cost to implement. A switch that can provide a path for every user on demand is called a nonblocking switch, and a switch with restricted connectivity is called a blocking switch. Due to the large number of surplus crosspoints in stage 2 of FIG. 4, this is a nonblocking crosspoint switching network.

The three-stage switching matrix shown in FIG. 4 can be implemented using off-the-shelf semiconductor crosspoint switches such as the type available from Motorola Semiconductor, Part No. MC3416. This is a 4×4 crosspoint switch which can be ganged together in a matrix configuration to implement the 32×63 crosspoint switches 301, 302, 303, the 64×64 crosspoint switches 304, 305, 306, and the 63×32 crosspoint switches 307, 308, 309. Implementation of a 2048×2048 switch of the type shown in FIG. 4 using 4×4 crosspoint switches requires 32,512 crosspoint chips (not counting the control chips) and creates a switch with 520,000 crosspoints. A switch of this size presents enormous problems of complex interstage wiring, complex control structures, and high cost of implementation. The disadvantages of a space switch of the size shown in FIG. 4 are high cost of maintenance and low flexibility in expansion or contraction of the size of the switch.

DETAILED DESCRIPTION OF THE PREFERRED EMBODIMENT

Despite efforts in both the telephone industry and the computer industry, designers have been unable to devise an improved space division switch which has been commercially successful. It has generally proved more cost-effective, as demonstrated by the current PBX offerings, to build time division switches or hybrid time/space division switches than to build pure space division switches. But the technical advantages of space division switching are such that it is worth finding a more economical way to implement the idea.

A discussion of the space switch of the present invention begins with a conceptual reconfiguration of the three-stage switching matrices shown in the prior art FIGS. 3 and 4. FIG. 5a shows a portion of the standard configuration for a three-stage space division switch. Only the top row is shown for clarity. To follow the reconfiguration of this space switch into the present invention, the inlet side of stage 1 is labeled I1 and the outlet side of stage 1 is labeled O2. Similarly, stages 2 and 3 bear the labels I3, O4, and I5, O6 respectively.

As shown in FIG. 5b, the outlet side of the switching matrix O6 is folded around and placed adjacent to the inlet side I1 of the switching matrix, as shown in the folded configuration of FIG. 5b. This is a more logical arrangement for a network interface because most communications devices which attach to the switch require both an inlet and an outlet at the attachment point.

FIG. 5c is a conceptual view of a new configuration in which the crossbar assemblies themselves have been broken apart and reassembled according to function instead of according to their mechanical design. Under this new configuraiton of FIG. 5c, the inlet and outlet sections have been paired in a way that is different from the original design and labeled as the I/O stage. This new conceptual configuration expresses what we would like to functionally accomplish with the present invention. FIG. 5c does not represent real hardware, because we simply cannot split apart a crossbar assembly and reassemble it as proposed. Also, the question mark of FIG. 5c indicates that we have not yet identified the type of connection that has to be made between the I/O stage and transfer stage shown in FIG. 5c In our functional reconfiguration, three stages are labeled the I/O stage, transfer stage, and crossover stage, which represent three different functional portions of the present invention.

Digital Exchange Circuit Element

Figure 6:
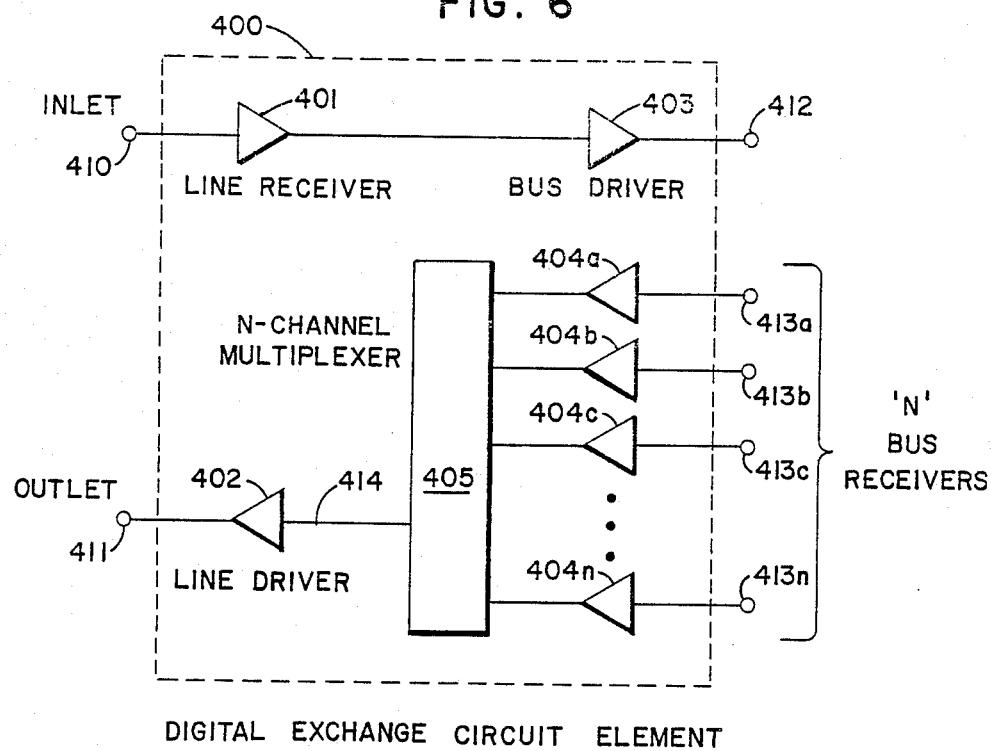
FIG. 6 shows the digital exchange circuit element in a block diagram form which forms the basis of the present invention.

FIG. 6 illustrates a novel circuit element which satisfies the requirements of the new switch configuration proposed in FIG. 5c. This device, labeled the Digital Exchange Circuit Element, can be used in place of any pair of the portions I1/O2, I3/O4, and I5/O6 devices shown in the conceptual configuration of FIG. 5c. Thus, the digital exchange circuit element can be used as a building block for a larger-switching switch network.

If the digital exchange circuit element of FIG. 6 is used in the I/O stage of the new configuration shown in FIG. 5c, inlet 410 and outlet 411 would serve as an interface to the transmission media. Line receiver 401 and line driver 402 connect to inlet 410 and outlet 411 respectively for reception and transmission of analog or digital communications. If, by way of example, the transmission media were twisted pair cabling (telephone wire), then line receiver 401 and line driver 402 would be EIA RS-422 receiver and driver chips, respectively. And if, as another example, the transmission media were fiber optic cabling, then line receiver 401 and line driver 402 would be a fiber optic receiver and fiber optic transmitter respectively.

Bus driver 403 is a standard bus driver computer element. It provides as an output a copy of the inlet signal at a level which can be transferred through the connector plane of a computer. Bus receivers 404a–404n represent a quantity (N) assemblage of bus receiver chips which are also a standard computer element available in the industry. The number (N) of receiver chips required is a decision made by the designer of the final implementation of the space switch, just as the choice was previously made in the size of crossbar assemblies required to satisfy a particular requirement. As will be shown later, the inlet signals from the bus drivers 403 are connected to the bus receivers 404a–404n in a prescribed way through the connectors 412 and 413a–413n.

N-channel multiplexer 405 is used to multiplex the quantity (N) signals received from bus receivers 404a–404n to output line 414. The structure of N-channel multiplexer 405 is not shown, but it is commonly known to those skilled in the art that, for example, a 64-line to 1-line multiplexer could be implemented using a 6-bit address decoder to select one of N signals received on lines 404a14 404n. Very wide channel multiplexers can be implemented from smaller-width channel multiplexers by placing the smaller-width multiplexers in parallel and implementing an external addressing control function to select the individual multiplexers based on additional address lines decoded by the external control. An example of this would be to implement a 64-channel multiplexer using four 16-to-1-line channel multiplexers and wiring the single line outputs of the individual multiplexers together to form a single output. The techniques for doing this are commonly known in the computer field, and it is this multiplexer component that performs the actual switching operation. N-channel multiplexer 405 can be implemented using either digital multiplexers (such as a 16-line to 1-line digital multiplexer available from Texas Instruments Incorporated, Part No. SN74150) or analog multiplexers (such as a 16-line to 1-line analog multiplexer available from Precision Monolithics Incorporated, Part No. MUX-16).

The digital exchange circuit element shown in FIG. 6 can also be used in the transfer stages and crossover stages of the conceptual configuration shown in FIG. 5c. simplify interconnect on a local basis. The actual control of the digital exchange element, and in particular the control of the N-channel multiplexer, is not shown here but will be shown in detail below. The control structure is omitted at this point to simplify the discussion of the interconnection and functioning of the exchange elements.

The specific use of the digital exchange circuit element is quite different from the specific use made of a crossbar assembly, as has been shown in the discussion for FIGS. 5a–5c . The individual crossbar elements of FIG. 1 as used in the multi-stage crossbar assemblies of FIGS. 3 and 4 are comprised simply of an effective line receiver inlet, line driver outlet, and a switching matrix between. The crossbar switch of FIG. 1 cannot be used in the conceptual configuration shown of FIG. 5c, since it is impossible to segregate the switching function from the inlet and outlet functions of the device. In contrast to this, the digital exchange circuit element has a line driver/receiver pair at one interface and a bus driver/receiver pair at the other interface. The switching multiplexer is connected only through one path through the digital exchange circuit element which lends itself to a functional implementation of the conceptual configuration shown in FIG. 5c. The actual configuration of a large space switch using the digital exchange circuit element will be presented below.

The digital exchange circuit element is also unique in that the inlet and outlet interface devices are grouped together such that it would be easily implemented on a single printed circuit board, which lends itself to modularity for large-scale designs. In actual implementation described below, a variety of printed circuit boards would be manufactured, each employing one kind of interface (EIA RS-422, fiber optic, etc.); yet all of the boards would be otherwise identical, and this similarity of construction would lead to certain economies of manufacture due to the modularity of the design.

In large digital exchange switching networks it is intended that a large number of digital exchange circuit elements be used to implement the exchange switch. In this application, a large number of digital exchange circuit elements can be manufactured on the same die of a VLSI chip and placed in a package with a large number of pins. The only limitation on the number of digital exchange circuit elements that may be packed in a single VLSI circuit is the limitation on fabrication technology and the pinout limitations. An advantage of packing a large number of digital exchange circuit elements of the type shown in FIG. 6 is the reduced requirement for the bus driver 403 to drive long bus lines and a large number of bus receivers 404. In a VLSI circuit the bus receivers may be eliminated if bus driver 403 has sufficient power to drive the long bus lines with enough power to distribute its output signal to N multiplexers. Hence, the drive capability of bus receiver 403 is N loads (N multiplexers in N digital exchange circuit elements corresponding to N bus lines.) In small applications of the digital exchange circuit element in board level environments, the same requirements of drive capability of bus driver 403 holds true, and the elimination of the bus receivers may still be possible. In addition, line receiver 401 and line driver 402 may be unnecessary in applications where short cable lengths and high drive signals are received and transmitted through the digital exchange circuit element. Hence, the minimum configuration of the digital exchange circuit element would be N-channel multiplexer 405 and the bus driver 403. Bus driver 403 must be capable to drive N elements where the number of elements correspond to the number of bus lines and the number of multiplexers in the digital exchange network.

Multi-Stage Space-Switch Network

Figure 7:
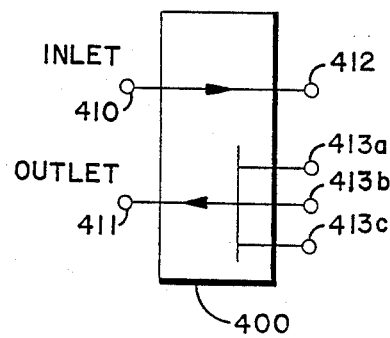
FIG. 7 is a symbolic representation of the digital exchange circuit element presented in FIG. 6. It is presented as a shorthand notation to allow the drawing of more complicated assemblies.

FIG. 7 is a symbolic representation of the digital exchange circuit element presented in FIG. 6. It is intended as a shorthand notation to allow us to draw more complicated assemblies without incurring distracting complexities.

Figure 8:
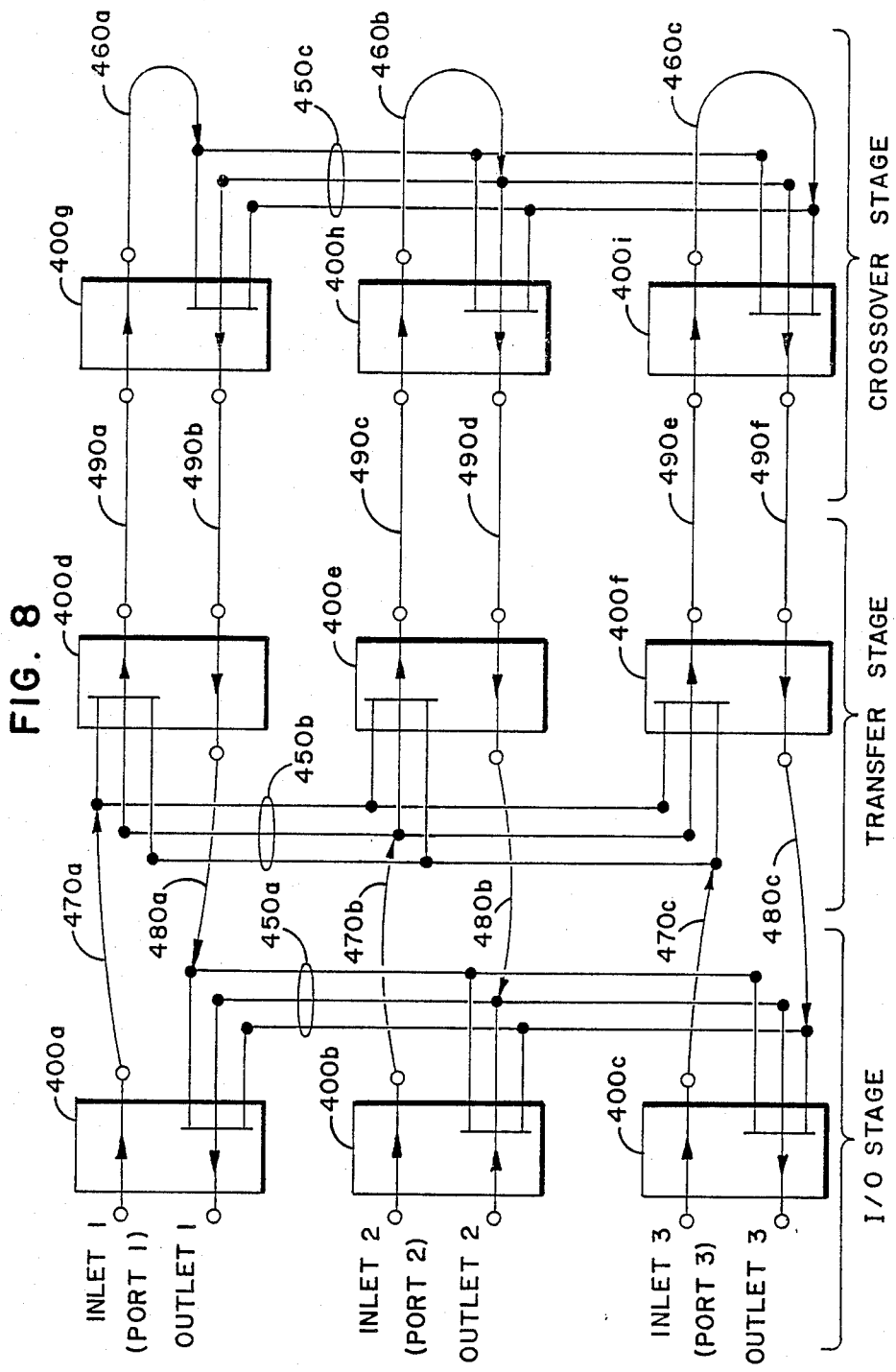
FIG. 8 is a three-stage switching matrix constructed with the digital exchange circuit element. This is a 3×3 exchange switch implemented solely to illustrate various features of the present invention.

FIG. 8 is a three-stage switching matrix constructed with a plurality of the digital exchange circuit element shown in FIG. 6. The schematic exchange circuit element symbol of FIG. 7 is used to simplify the explanation and drawing. This three-stage exchange switch is a 3×3 switch which is smaller in design than would normally be implemented, and is presented here solely to illustrate the various features of the interconnection of the stages of the digital exchange circuit elements. The three switching stages are identified as the I/O stage, the transfer stage, and a crossover stage.

At the left of FIG. 8 are three inlet/outlet pairs identified as port 1 (inlet 1/outlet 1), port 2 (inlet 2/outlet 2), and port 3 (inlet 3/outlet 3). These ports are the points at which users of the space switch would attach the terminal equipment. Ordinarily, a single user requires both an inlet and an outlet, requiring the switching matrix to be used to connect a user at port 1 to a user at port 2, connecting inlet 1 to outlet 2 and outlet 1 to inlet 2.

Digital exchange circuit elements 400a–400i are the digital exchange elements identical to the type disclosed in FIG. 6. The only other components of this three-stage digital exchange switch of FIG. 8 are the interstage connecting wires which are arranged in a specific configuration. The group of wires labeled 450a, which is shown to include three wires, is a communications bus consisting of three channels. In practice, the communication bus 450a would contain as many separate channels in the bus as there are bus receiver chips feeding into the multiplexer of the digital exchange circuit element (see multiplexer 405 in FIG. 6). All three stages of the digital exchange switch shown in FIG. 8 use multi-channel buses to interconnect the digital exchange circuit elements, as represented by the groupings of wires labeled 450a, 450b and 450c.

The I/O stage is cabled to the transfer stage through interstage cabling 470a–470c and 480a–480c. For example, interstage cable 470a connects the bus driver of digital exchange element 400a of port 1 in the I/O stage to one of the bus wires of bus 450b and in turn to the bus receivers in digital exchange circuit elements 400d, 400e and 400f in the transfer stage. Also, the interstage cable 480a connects the bus driver connection of digital exchange circuit element 400d in the transfer stage to one of the bus wires of bus 450a and in turn to the bus receivers in digital exchange elements 400a, 400b and 400c in the I/O stage. The reader's attention is called to the symmetry of the design in accomplishing the interstage cabling, and the rest of the details of the interstage cabling between the I/O stage and transfer stage is omitted.

Interstage cables 490a–490f connect the transfer stage and the crossover stage. For example, interstage cable 490a connects the line driver of digital exchange circuit element 400d in the transfer stage to the line receiver of digital exchange circuit element 400g in the crossover stage. Interstage cable 490b connects the line driver of digital exchange circuit element 400g in the crossover stage to the line receiver of digital exchange circuit element 400d in the transfer stage. The rest of the interstage cabling between the transfer stage and the crossover stage follows a similar pattern.

The fold-over concept discussed in conjunction with FIG. 5b is the key to the crossover stage shown in FIG. 8. Intrastage cables 460a–460c are used to connect the bus drivers to the bus receivers within the crossover stage. For example, intrastage cable 460a attaches the bus driver of digital exchange circuit element 400g to one of the channels of the group of bus lines 450c. This bus channel attaches to the bus receivers of digital exchange circuit elements 400g, 400h and 400a all of the crossover stage. In a like fashion, intrastage cables 460b and 460c attach the individual bus drivers of the digital exchange circuits of the crossover stage to one of the individual channels of the bus group 450c, which in turn drives all of the digital exchange circuit elements of the crossover stage.

The connection from one port to another port through the three-stage digital circuit exchange switch of FIG. 8 operates as follows. If a user at port 1 wishes to connect to a user at port 3, a request is made at inlet 1. Any one of the three digital exchange circuit elements at the transfer stage which happens to be free can pick up the request by switching its multiplexer to the appropriate channel on bus 450b. The request then moves from one of the transfer stage digital exchange switch elements to the inlet side of one of the digital exchange circuit elements in the crossover stage. The request is then passed from the inlet side to the bus driver side of one of the digital exchange circuit elements of the crossover stage, where it is transferred to bus 450c. Any one of the three digital exchange circuit elements at the crossover stage which happens to be free can pick up the request by switching its multiplexer to the appropriate channel on bus 450c. The request then moves from the selected digital exchange circuit element of the crossover stage to the inlet side of the coresponding digital exchange circuit element of the transfer stage. The inlet side of the transfer stage element passes the request to the I/O stage bus 450a. Outlet 3 then picks up the request by switching the multiplexer in digital exchange circuit element 400c to the appropriate channel on bus 450a. A connection would then be made between inlet 1 of port 1 to outlet 3 of port 3. In a similar way, a connection is made between inlet 3 of port 3 and outlet 1 of port 1. This connection could be made in parallel with the connection previously described.

Single Stage Space-Switch Network

As was mentioned above, FIG. 8 illustrates a multi-stage digital exchange switch implemented using a plurality of digital exchange circuit elements. However, the implementation of the digital circuit exchange switch of FIG. 8 is not a very practical design, since a single 3×3 exchange switch has been implemented using nine digital exchange circuit elements. The rationale for sizing a digital circuit exchange switch is the same as the sizing rationale for multi-stage crossbar designs. Single-stage designs are good for small switches (i.e., less than 50 to 100 ports), and multi-stage designs are appropriate for larger switches. It is therefore apparent that the use of a multi-stage digital circuit exchange switch for implementing a 3×3 exchange is extremely inefficient.

Figure 9:
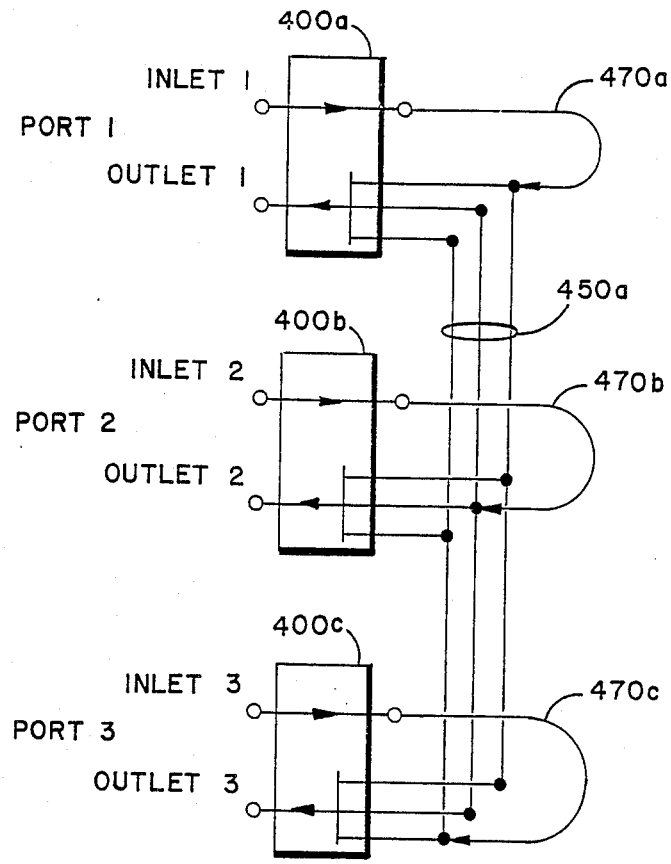
FIG. 9 shows a 3×3 digital exchange switch implemented more efficiently as a single-stage switch using three of the basic digital exchange circuit elements shown in FIG. 6

FIG. 9 shows a 3×3 digital circuit exchange switch implemented more appropriately as a single-stage switch. The connection of inlets to outlets is like that used for the crossover stage of the three-stage switch shown in FIG. 8. Only three digital exchange circuit elements are required to implement this 3×3 exchange switch showing the inherent versatility of this one basic element as described in FIG. 6 in implementing space switches. This versatility is an advantage inherent in the design of the digital circuit exchange switch.

The advantages of using the digital exchange circuit element in a modular design of a space switch becomes more apparent when constructing a space switch with a very large number of ports. In the discussion that follows, the construction of a 4,096-channel exchange switch is described. A switch of this size is substantially larger in the context of space switching than any switch known to be in service today.

Exchange Switch Board and Backplane

Figure 10:
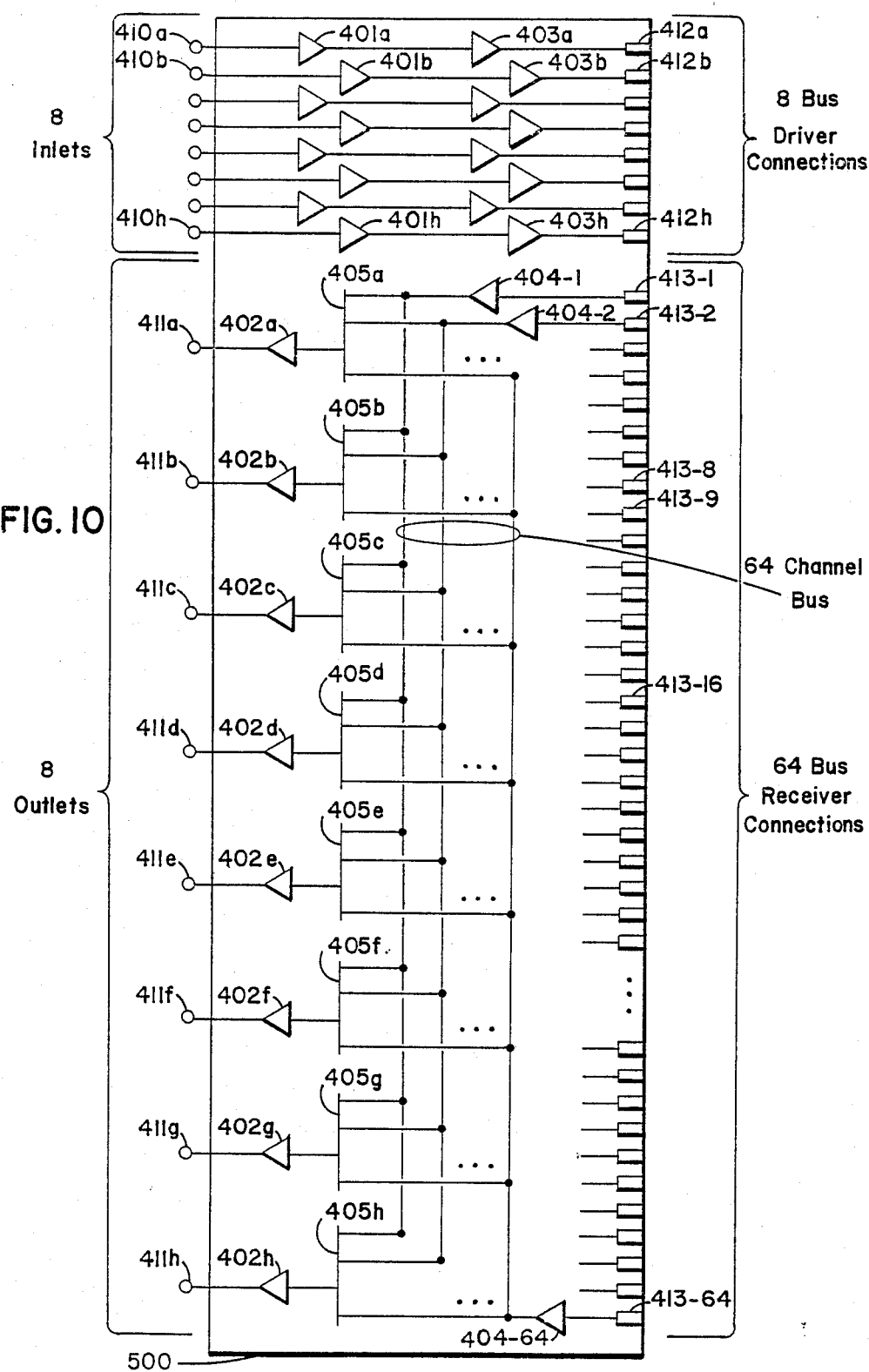
FIG. 10 depicts a printed circuit board on which eight of the digital exchange circuit elements of FIG. 6 have been placed in a modular design.

FIG. 10 depicts a printed circuit board on which have been placed eight of the digital exchange circuit elements of FIG. 6. The eight inlet circuits 410a-410h are shown extending through line receivers 401a-401h, through bus drivers 403a-403h and extending onto the eight separate foils 412a-412h on the edge connector side of the PC board 500. If the bus drivers 403a-403h were differential drivers in another implementation, then there would be two connector foils per driver. In the preferred embodiment, differential bus drivers and receivers are used for better noise immunity but single line drivers and receivers are shown in the drawings for simplicity.

On the outlet portion of PC board 500 there are eight multiplexers, each of which is a 64-line to 1-line multiplexer. The schematic form of representation of the multiplexer adopted in FIG. 7 is used in FIG. 10 as a shorthand notation to depict the multiplexers. The 64-line bus is necessarily abbreviated for clarity. The 64-channel bus is driven from the foil contacts on the edge connector side of PC board 500 labeled in sequential order 413-1 through 413-64. The foil contacts on the edge connector of PC board 500 directly drive bus receivers 404-1 through 404-64. These bus receivers, previously described in conjunction with the description of FIG. 6, directly drive the 64-channel bus on PC board 500. It is intended that any one of the 64 bus receivers 404-1 through 404-64 can be connected to any one of the eight outlet line drivers 402a-402h by proper selection at each of the eight multiplexer control ports (not shown). The selected outputs from line drivers 402a-402h are presented on one of the eight outlets 411a-411h respectively.

Figure 11:
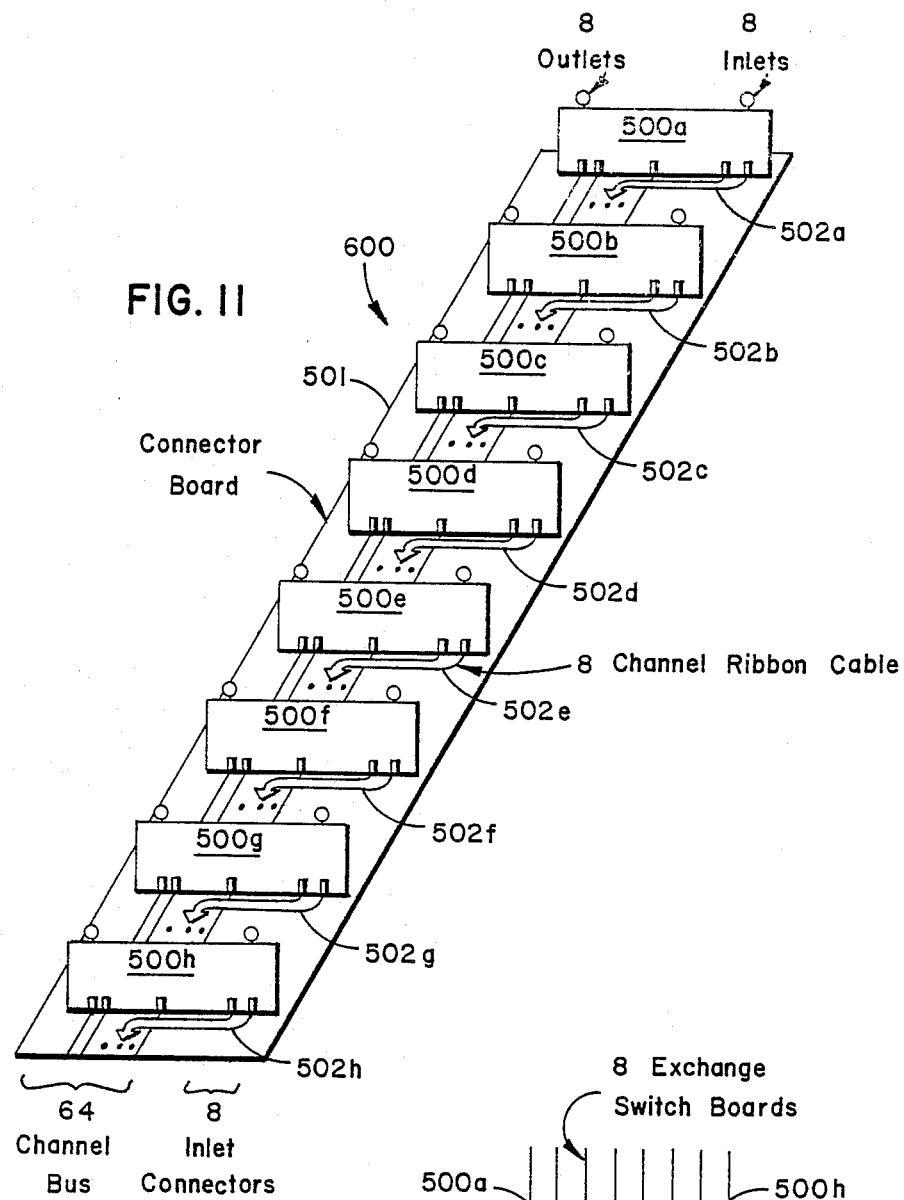
FIG. 11 is a perspective view of a digital exchange connector board on which eight exchange switchboards have been interconnected in a modular design.
Figure 11A:
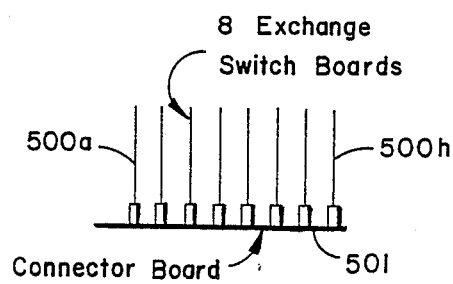
FIG. 11a is a side view of the digital exchange connector board shown in FIG. 11.

Printed circuit board 500 of FIG. 10, which we shall call an exchange switch board, is combined with other boards of identical design in a rack 600, as indicated in FIG. 11. The backplane 501 of the rack 600 is a connector board which provides mating connectors 503a-503h for the exchange switch boards 500a-500h mounted perpendicular to the back plane 501. This backplane provides mating connectors for exchange switchboard connectors (shown in FIG. 10 as bus driver connections 412a-412h and bus receiver connections 413-1 through 413-64) which provide for interconnection between each of the exchange switch boards 500a-500h. A side view of this rack 600 is shown in FIG. 11a in which the eight exchange switch boards 500a-500h are connected into backplane 501 through connectors 503a-503h.

The backplane connector board 501 is also a printed circuit board in which the interconnect is formed in foil. The backplane buses together the 64 bus receivers (shown in FIG. 10) on each of the exchange switch boards 500a-500h. The connector backplane board is designed to accomodate eight exchange switch boards in the preferred embodiment. These eight exchange switchboards have collectively 64 outlets (eight per exchange switch board) and it is intended that each of the 64 channels of the connector board bus can be connected to each of the 64 outlets.

In the preferred embodiment of the 4,096×4,096 exchange switch network, several general rules were applied to this design. First, the size of the bus on the connector board (64-channel) is made to match the size of the bus on the exchange switch board (64-channel), and that bus in turn was made to match the size of the individual multiplexers (64-line to 1-line) on the exchange switch boards. Second, the number of exchange switch boards per connector board (eight) was chosen so that the combined number of outlets (eight outlets (eight boards=64) and the combined number of inlets (eight inlets×eight boards=64) match the size of the bus.

The rules stated above are arbitrary and are not intended to limit the application of the digital exchange circuit element. They are presented here only to show an example of the preferred embodiment to the present invention. These rules lead in general to a blocking switch, but the probability of blocking is acceptably low an the uniformity of the component parts leads to a very practical and modular design.

The rack 600 shown in FIG. 11 is not yet a digital circuit exchange switch. The eight bus drivers on each of the exchange switch boards 500a–500h must be connected to the 64-channel bus on a connector board. A single stage exchange switch, which would be a much larger version of the one described in FIG. 9, can be constructed by connecting as indicated by the arrows 502a–502h in FIG. 11 the eight bus drivers to eight of the 64 channels on the connector board bus. This connection would typically be made with ribbon cables. The eight bus drivers from each of the eight exchange switch boards would connect to a different group of eight channels on a connector board. For example, using the PC board 500 edge connector labeling found in FIG. 10, bus driver connection lines 412a–412h of exchange switch board 500a would be connected by ribbon cable to eight channels of the 64-channel bus corresponding to bus receiver foil connections 413-1 through 413-8 shown on the 64 outlet connections of FIG. 10. Next, bus driver connections 412a–412h, shown on PC board 500 of FIG. 10 corresponding to the eight bus driver connections on exchange board 500b, would be connected by ribbon cable 502b. to eight of the channels of the 64-channel bus corresponding to bus receiver connections 413-9 through 413-16. In a similar fashion, exchange boards 500c through 500h would be connected to a different set of eight channels of the 64-channel bus through ribbon cables 502c–502h respectively.

The final effect of connecting ribbon cables 502a–502h to the 64-channel bus of backplane 501 of rack 600 is that the 64- combined inlets of all eight exchange boards attach separately to the 64 channels of the connector back plane board bus. Given the construction described above, any of the 64 inlets can be connected to any one of the 64 outlets, and thus is constructed a 64×64 single-stage digital circuit exchange switch using a plurality of the digital exchange circuit elements shown in FIG. 6.

Interstage and Intrastage Cabling

A still larger multi-stage exchange switch can be formed by connecting multiple racks of eight boards each. FIG. 12 depicts three racks that are identical to the single rack described in FIG. 11, except that the bus drivers on each individual exchange board of each rack would be connected to the buses in a different manner. Each rack 600a–600c is a separate unit and there is no extension of the 64-channel connector board bus between the racks. Racks 600a, 600b and 600c shown in FIG. 12 are incomplete so that a more detailed view of the inter-rack cabling can be explained. It will be understood that five additional boards are included in each of the racks 600a, 600b and 600c, and the alphanumeric numbering system used throughout to describe the individual components of these switch boards and racks will assume a series to include the additional boards not shown.

A three-stage exchange switch is constructed by first connecting the bus drivers on the individual exchange switch boards 500a–500s as indicated by the arrows 502a–502s which represent the ribbon cables. Note that the bus drivers from I/O stage rack 600a are connected through ribbon cables 502a–502c (ribbon cables 502d–502h not shown but connected in a like manner) to the 64-channel bus on the transfer stage rack 600d. Also, the bus drivers from the individual exchange boards on the transfer stage rack 600b are connected through ribbon cables 502i–502k (ribbon cables 502i–502p are not shown but are connected in a like manner) to the 64-channel bus of the I/O stage rack 600a in the manner described for the description of the interconnect shown in FIG. 11. The bus drivers from the individual exchange boards on the crossover stage rack 600c are connected through ribbon cables 502q–502s (ribbon cables 502t–502x not shown but connected in a like manner) to the 64-channel bus on the crossover stage rack 600c. These are the same types of connections as shown in FIG. 8, but on a larger scale.

The interstage and intrastage ribbon cable connections in FIG. 12 can be described in terms of the interconnection labeling shown in FIGS. 10 and 11. Exchange board 500a shown in the I/O stage rack 600a of FIG. 12 has its eight bus driver connections labeled in FIG. 10 as 412a–412h connected through ribbon cable 502a to eight of the channels of the 64-channel bus shown in transfer stage 600b in FIG. 12. The eight channels corresponding to the connection of ribbon cable 502a would correspond to PC board bus receiver connections 513-1 through 513-8 shown in FIG. 10. The bus driver connections 412a–412h on the exchange switch board shown in FIG. 10 and corresponding to the same bus driver connections on digital exchange board 500b of I/O stage rack 600a in FIG. 12 are connected through ribbon cable 502b to the second group of eight channels of the 64-channel bus of transfer stage rack 600b. These next eight channels would correspond to the bus receiver foil connections 413-9 through 413-16 shown in FIG. 10. Similar connections are made for the ribbon cables 502c–502h (ribbon cables 502d–502h are not shown but are connected in the order and manner described above).

The eight bus driver connections of digital exchange board 500i shown in transfer stage rack 600b of FIG. 12 would correspond to the eight bus driver connections 412a–412h shown on PC board 500 of FIG. 10 and are connected through ribbon cable 502i to eight channels of the 64-channel bus of I/O stage rack 600a. Ribbon cable 502i would connect to the first eight channels in the preferred embodiment which correspond to exchange switch board bus receiver foil connections 413-1 through 413-8 shown in FIG. 10. In a similar fashion, the eight bus driver connections of exchange switch board 500j corresponding to the bus driver connections 412a–412h shown in FIG. 10 would be connected through ribbon cable 502j to the next eight channels of the 64-channel bus on the I/O stage rack 600a corresponding to bus receiver foil connections 413-9 through 413-16 on the exchange switch board shown in FIG. 10. Ribbon cables 502k through 502p would connect the remaining exchange boards of transfer stage rack 600b to the 64-channel bus of I/O stage rack 600a (ribbon cables 502i–502p are not shown but are connected in the order and manner described above).

The eight bus driver connections on exchange switch board 500q on the crossover stage rack 600c shown in FIG. 12 and corresponding to the eight bus driver connections labeled 412a–412h - shown in FIG. 10 would connect to the first eight channels of the 64-channel bus of the crossover stage rack 600c shown in FIG. 12. This connection would correspond to the first eight bus receiver foil connections labeled 413-1 through 413-8 shown in FIG. 10. The eight bus driver connections of exchange board 500r of crossover stage rack 600c shown in FIG. 12 and corresponding to the eight bus driver connections labeled 412a–412h shown in FIG. 10 are connected through ribbon cable 502r to the next eight channels of the 64-channel bus of the crossover stage rack 600c. The next eight channels that ribbon cable 502r would connect to correspond to bus receiver foil connections 413-9 through 413-16 shown in FIG. 10. In a similar fashion, ribbon cables 502s–502x would be connected to the 64-channel bus of crossover stage rack 600c (ribbon cables 502t–502x are not shown in FIG. 12 but are connected as previously described in the indicated order).

4096-Channel Exchange Switch Network

Figure 13:
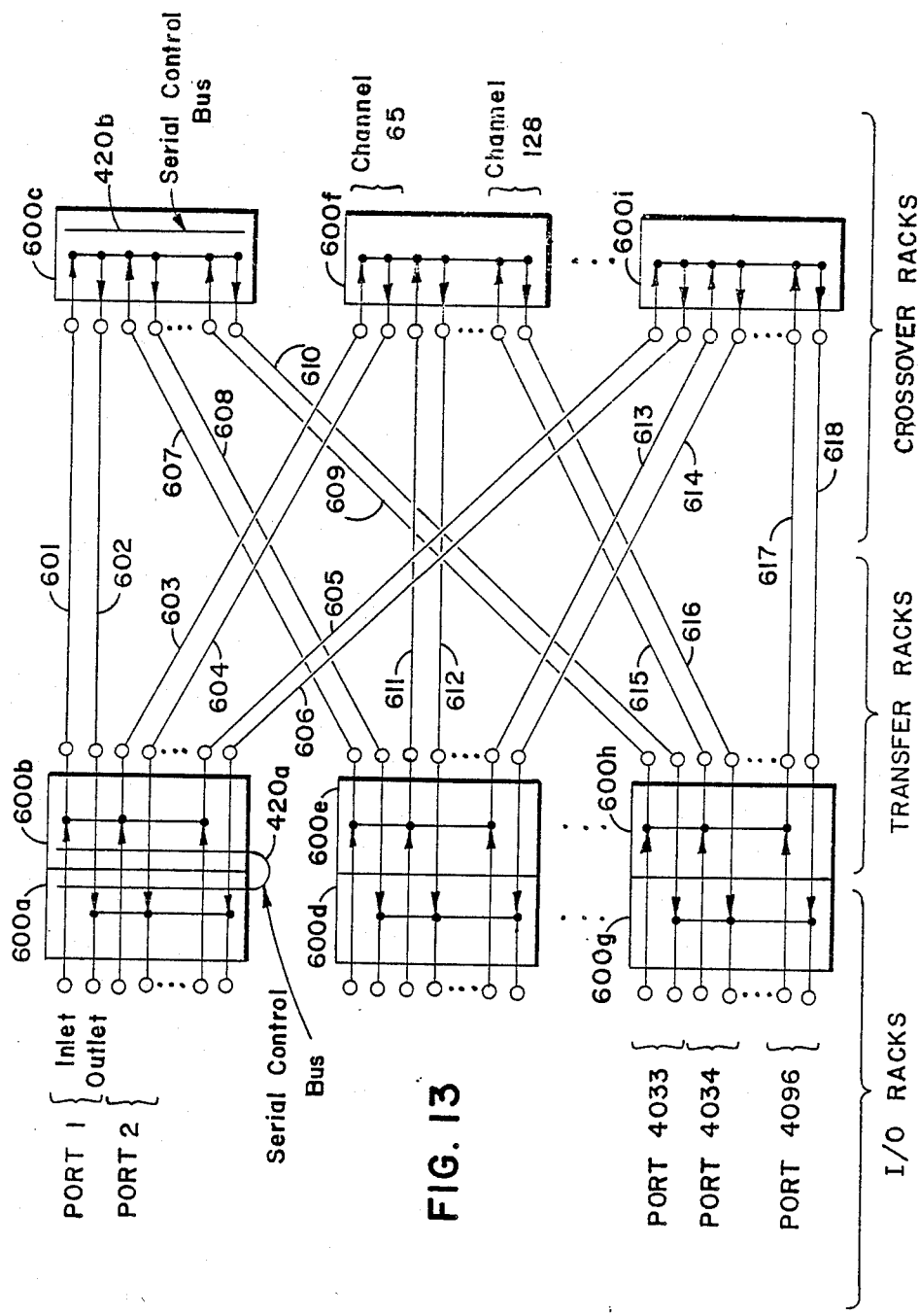
FIG. 13 illustrates the desired connection between the transfer stage in the transfer rack and the crossover stage found in the crossover rack of the modular exchange switching network shown in FIG. 12. The completed design shown in FIG. 13 depicts a 4096×4096 channel exchange switch network.

The completed interconnections shown in FIG. 12 do not yet create a three-stage digital circuit exchange switch. The connections between the transfer stage and crossover stage must be completed to make the switch operational. FIG. 13 illustrates the desired connection between the transfer and crossover stages. FIG. 13 is a schematic view of a 4,096-channel exchange switch using a shorthand notation to describe the various stages. Since we are trying to capture the idea of a very large exchange switch on a small piece of paper, this notational shorthand is necessary. Note that the three racks of FIG. 12 have been greatly simplified in FIG. 13. The racks of FIG. 12 appear as items 600a, 600b and 600c as placed in the I/O rack, transfer rack, and crossover rack stages. Racks 600d–600i are additional digital exchange switch racks identical to those described in FIGS. 11 and 12. Due to the enormity of the design, not all the connections are shown in FIG. 13, nor are all of the racks drawn. The I/O stage of FIG. 13 is comprised of 64 racks, three of which are shown. In a like fashion, the transfer stage and crossover stage of FIG. 13 also are comprised of 64 racks, each identical to the rack shown in FIG. 11, only three of which are shown for each stage. Ellipses are used in FIG. 13 to indicate the connections and racks not shown in the drawing of FIG. 13. As indicated by the rack numbers, there are intended to be 64 I/O racks, 64 transfer racks, and 64 crossover racks. As there are 64 I/O racks, and as such each I/O rack represents 64 a 4,096-channel (64 channels×64 I/O racks=4,096 channels) digital circuit exchange switch.

The interconnect between the transfer stage devices and the crossover stage devices is done in much the same manner as was done with the multi-stage crosspoint switch of FIG. 4. Each of the transfer stage channels from one rack connects to one of the crossover channels of each of the crossover racks, and each of the crossover channels from one rack connects to one of the transfer channels in each of the transfer racks. This can be shown in detail by a reference to FIG. 13. The first of the line driver outlets on transfer stage rack 600b drives interstage cable 601 which in turn connects to the first line receiver inlet on crossover stage rack 600c. To maintain symmetry in the cabling of this exchange switch, the first outlet line driver of crossover rack 600c drives interstage cable 602 which in turn drives the first inlet line receiver of the 64 inlets on transfer stage rack 600b. This completes the first of 4,096 interstage cable wire pairs between the transfer racks and the crossover racks.

The second line driver outlet of transfer rack 600b is connected through interstage cable 603 to the first line receiver inlet on crossover rack 600f. In a symmetrical fashion, the first line driver outlet of crossover rack 600f drives the return interstage cable 604 to the second line receiver inlet of transfer stage rack 600b. This completes the second of the 4,096 interstage cablings. The remaining 62 inlet/outlet pairs on transfer rack 600b are in a similar fashion connected to each of the inlet/outlet pairs in the first position on each of the crossover racks.

The 65th inlet/outlet interstage cabling pair between the transfer racks and the crossover racks are lines 607 and 608 of FIG. 13. The first line driver outlet of the second transfer stage rack 600e drives interstage cable 607 to the second inlet line receiver of the first crossover rack 600c. In a symmetrical fashion, the second outlet of the first crossover stage rack 600c drives interstage cable 608 to the first line receiver inlet of the second transfer stage rack 600e. The remaining inlet/outlet pairs of the second transfer stage rack 600e are connected in a like fashion to the second inlet/outlet pairs of each of the crossover racks in the crossover stage. The remaining 62 racks in the transfer stage are connected in a like symmetrical fashion to each of the crossover stage racks in the crossover stage.

Paths Through the Network

It would be helpful in understanding the operation of the 4,096-channel exchange switch to follow a connection through the circuit exchange. Suppose that a user at port 1, shown in FIG. 13, wishes to connect to a user at port 4,034. The request is made at inlet 1 and appears on one channel of the 64-channel bus of transfer stage rack 600b. Any free transfer stage digital exchange switch within that rack can switch its multiplexer, pick up the request and send it to one of the 64 crossover stage racks. In this example, assume that the second channel of transfer stage rack 600b picked up the request and thus will send it over interstage cable 603 to crossover rack 600f. The first line inlet at crossover stage rack 600f is tied to one channel of the 64-channel bus within that individual crossover stage rack so that any line outlet from the crossover stage rack 600f can switch its multiplexer and pick up the request. Crossover stage rack 600f has one path to transfer rack 600h, which is the 64th channel of crossover rack 600f through interstage cables 615, 616. Since a single channel exists from the second crossover rack 600f to the 64th transfer rack 600h, that path may or may not be busy. If that path is busy, then a different channel in transfer rack 600b will have to try to complete the connection through a different crossover rack. Once an open path is found, the request is presented to the 64-channel bus of the I/O stage and outlet 4,034 on I/O stage rack 600g. The reverse path from inlet 4,034 to outlet 1 can be completed in parallel to the initial path, and at that point a connection is said to exist between the user at port 1 and the user at port 4,034.

Smaller Multi-Stage Switch Networks

A 4,096-channel exchange switch is the largest digital circuit exchange switch we would choose to build based on a 64-channel bus. It will be understood by those skilled in the art that even larger exchange switches could be built using this same technique. A 4,096-channel exchange switch is a very large switch, and so rather than investigating still larger designs, a practical way to apply the circuit exchange board will be described for smaller implementations.

Table 1 presents configuration data for seven digital exchange switches in sizes ranging from 4,096 channels down to 64 channels. All of these exchange switches are constructed from the boards and racks described in the foregoing discussion. Smaller exchange switches may be created by reducing the number of I/O stage racks and transfer stage racks according to the number of channels required. However, the situation at the crossover stage needs further explanation. When connecting the transfer stage to the crossover stage, there must be as many crossover stage racks as there are transfer stage channels in one transfer stage rack. As the number of transfer stage racks is reduced, there still must be the same number of crossover stage racks but the size (in terms of bus channels and inlet/outlet pairs) of the individual crossover stage racks, which is equal to the number of transfer stages, becomes smaller. For example, if there are 32 transfer stage racks of 64 channels each, then there must be 64 crossover stage racks of 32 channels each. Also for example, if there are 16 transfer stage racks of 64 channels each, then there must be 64 crossover stage racks of 16 channels each. A similar type of symmetry in interconnecting the transfer stage racks and the crossover stage racks holds true for a reduced number of overall channels, as shown in Table 1. The designation "unit" may be a better term for describing the crossover stage subassemblies for exchange switches smaller than 4,096 channels. A crossover unit would consist of a group of digital exchange switches that share a common bus. The crossover units of the crossover stage would not share bus wires between them and so would function as separate racks.

TABLE 1

| | Exchange Switch Configuration | | |
|---|---|---|---|
| Channels | I/O Stage | Transfer Stage | Crossover Stage |
| 4096 | 64 racks<br>64 inlets<br>64 outlets | 64 racks<br>64 outputs<br>64 inputs | 64 units - 64 racks<br>64 inputs<br>64 outputs |
| 2048 | 32 racks<br>64 inlets<br>64 outlets | 32 racks<br>64 outputs<br>64 inputs | 64 units - 32 racks<br>32 inputs<br>32 outputs |
| 1024 | 16 racks<br>64 inlets<br>64 outlets | 16 racks<br>64 outputs<br>64 inputs | 64 units - 16 racks<br>16 inputs<br>16 outputs |
| 512 | 8 racks<br>64 inlets<br>64 outlets | 8 racks<br>64 outputs<br>64 inputs | 64 units - 8 racks<br>8 inputs<br>8 outputs |
| 256 | 4 racks<br>64 inlets<br>64 outlets | 4 racks<br>64 outputs<br>64 inputs | 64 units - 4 racks<br>4 inputs<br>4 outputs |
| 128 | 2 racks<br>64 inlets<br>64 outlets | 2 racks<br>64 outputs<br>64 inputs | 64 units - 2 racks<br>2 inputs<br>2 outputs |
| 64 | 1 rack<br>64 inlets<br>64 outlets | 0 racks | 0 units - 0 racks |

The benefit of the design rules or architectures that have been described herein is the fact that the smaller crossover stage units required to implement smaller exchange switches can be consolidated in the larger physical racks, thus reducing the overall number of physical racks as long as the units do not share bus wires. That is, two 32-channel crossover stage units can be placed into a single 64-channel rack without modification of any of the component parts. Each 32-channel unit will use 32 of the 64 bus channels available in the rack. This reduces the number of racks required to house 64 independent crossover channels from 64 to 32. The number of crossover stage racks and units required for each suggested configuration is shown in Table 1. The 64-channel exchange switch is unique because it matches the size of the connector board bus (64 channels) and can therefore be implemented as a single stage device.

A further benefit of the consolidation of multiple crossover stage units into racks which are larger than the unit is the fact that the connectivity of the crossover stage can be improved. The 64-channel bus together with the 64-channel multiplexer is available to each channel, effectively providing connection between the smaller crossover stage units which would not have existed if the crossover stages had been separately housed in different physical racks. Thus, allowing crossover stage units to share bus wires between units housed in the same rack provides additional communication paths.

Yet another benefit of the architecture described herein is its modularity. Given any of the three staged exchange switches presented in Table 1, it is not necessary that the transfer and crossover stages be fully populated with exchange switch boards, as described in the foregoing text. The 64 channels making up the transfer stage of one rack are achieved by inserting eight exchange switch boards into the rack. The entire exchange switch, however, would be able to complete some connections whether there were one board or eight boards in the transfer stage of the rack (with a matching number of boards distributed through the crossover racks). It is simply that there is a better chance of a communication being blocked as the number of boards is reduced. Expressed another way, the connectivity of the device improves as boards are added. The user can start with a small number of transfer stage and crossover stage boards and a small amount of interstage cabling, and then gradually improve the connectivity of the system when required by adding boards and cabling. This also makes the system more fault-tolerant in that a malfunctioning board can be ignored by the system and communications can be routed around it.

Applications of the 4,096-Channel Switch Network

The digital exchange switch network described above and shown in FIG. 13 has as its principal advantage the modularity of design and simplicity of the hardware. With this system, only one standard type of board is required which can be used in all racks and all stages of the network. In addition, all backplanes within the network are manufactured in an identical fashion and are for the most part interchangeable. In the preferred embodiment of the present invention, a DIP switch is placed in a socket of the backplane of each rack within each stage which provides information to the individual switch boards as to the type of backplane they are operating within and as to the location within the network.

In the description of the control structure discussed below, these DIP switches are the only difference between the hardware in all of the different stages.

It is difficult to compare the present invention with the crosspoint switching networks of the prior art, since it is extremely difficult to build a crosspoint switch having a 4,096-channel capacity such as that shown in the present invention. The crosspoint switch with such capability would become a wiring nightmare in trying to connect all of the individual crosspoint switching networks to each other. The advantage of the present invention is the use of a bus structured architecture which may be implemented using PC board backplanes. Due to the modularity of this design the wiring of the backplanes never changes, even though the capability of the system may be expanded or reduced. The prior art crosspoint switches, on the other hand, are fixed in their interconnect and are extremely resistant to network-size changes due to the hardwired designs. In contrast to this, the present invention allows expansion or contraction of the overall switching network merely by changing the population of the boards in the racks.

The crosspoint switching network of FIG. 4 is an example of a nonblocking crosspoint switch. The key feature that makes this implementation nonblocking is the fact that there are twice as many crosspoint switches in stage 2 as there are I/O ports. The implementation of blocking or nonblocking switches with various limits of capacity is a function of the switch network's application. In the switching network of the present invention as shown in FIG. 13, a blocking switch has been shown since the crossover stage contains the same number of channels as there are I/O ports. This switch can be expanded to be a nonblocking switch by doubling the capacity of the crossover stage. This can be accomplished by expanding the number of bus lines and boards from 64 to 128 within each of the 64 racks. This will allow for twice as many interconnections between the crossover stage and each of the transfer stage racks. In the alternative, a reduction in the number of ports within each I/O rack from 64 to 32 while leaving the same number of transfer stage and crossover stage channels will produce a switching network of 2,048 I/O channels but of a nonblocking variety.

The application of a switching network such as the type shown in FIG. 13 is better shown with a real-world example. The crossover stage is actually the hub of a wheel of a very large communications network. Individual I/O rack/transfer rack pairs are distributed from the crossover rack hub and from each of the other I/O rack/transfer rack pairs by a large distance. An example of this would be a communications network on a university campus. The crossover stage would be centrally located on the campus grounds while individual I/O rack/transfer rack pairs would be located in each of the university buildings. The interstage cables between the I/O rack and the transfer rack would be rather short due to the close proximity of the racks within the same or adjacent cabinets. On the other hand, the interstage cables between the transfer racks and the crossover racks would in the preferred embodiment be implemented in fiber optic cables covering long distances. The line drivers and line receivers therefor in the transfer racks and crossover racks would be compatible with fiber optic communications. In this fashion, each of the university buildings would have the capability of directly connecting any communications source with any other communication destination throughout the campus. This network would be insensitive to the type of communications, as long as in the preferred embodiment communcations remain digital and operate within a few simple prescribed parameters as discussed below. Examples of the types of communications that could be carried through this network are video, telex, facsimile, asynchronous or synchronous computer data, ISDN network interconnections, FM or PCM voice communications, etc.

Another application of the preferred embodiment of the present invention would be in a large office building. The plurality of crossover racks would be located in a central location within the building, either in the basement or in the central part of the building. Each of the I/O rack/transfer rack pairs would then be located on each of the individual floors within the building or within different sectors in a single-level building. Each I/O rack would allow the connection of 64 different communication users into the network who could communicate by the network to any one of the other ports connected to the network. The network need not be fully populated at the initial installation, and can be of any size described and shown in Table 1. As the communications traffic through the network grows and additional capacity is required, the modularity of the design allows for additional exchange switch boards to be inserted into the racks to improve throughput and switching capabilities.

Other variations of the preferred embodiment of the present invention are possible by varying the interstage and intrastage cabling between the exchange switchboard backplanes. Within certain connectivity restraints, the ribbon cables between the I/O stage and transfer stage may be mixed between adjacent racks to provide local connections between the racks without going through the crossover stage. Another connection variation would be to connect the ribbon cables from adjacent I/O racks to one another without going through the transfer stage. Other instrastage and interstage cabling variations will become known to those skilled in the art upon understanding this description of the preferred embodiment of the present invention and are included within the scope and the spirit of the present disclosure.

Control Structure of the Exchange Switch

Figure 14:
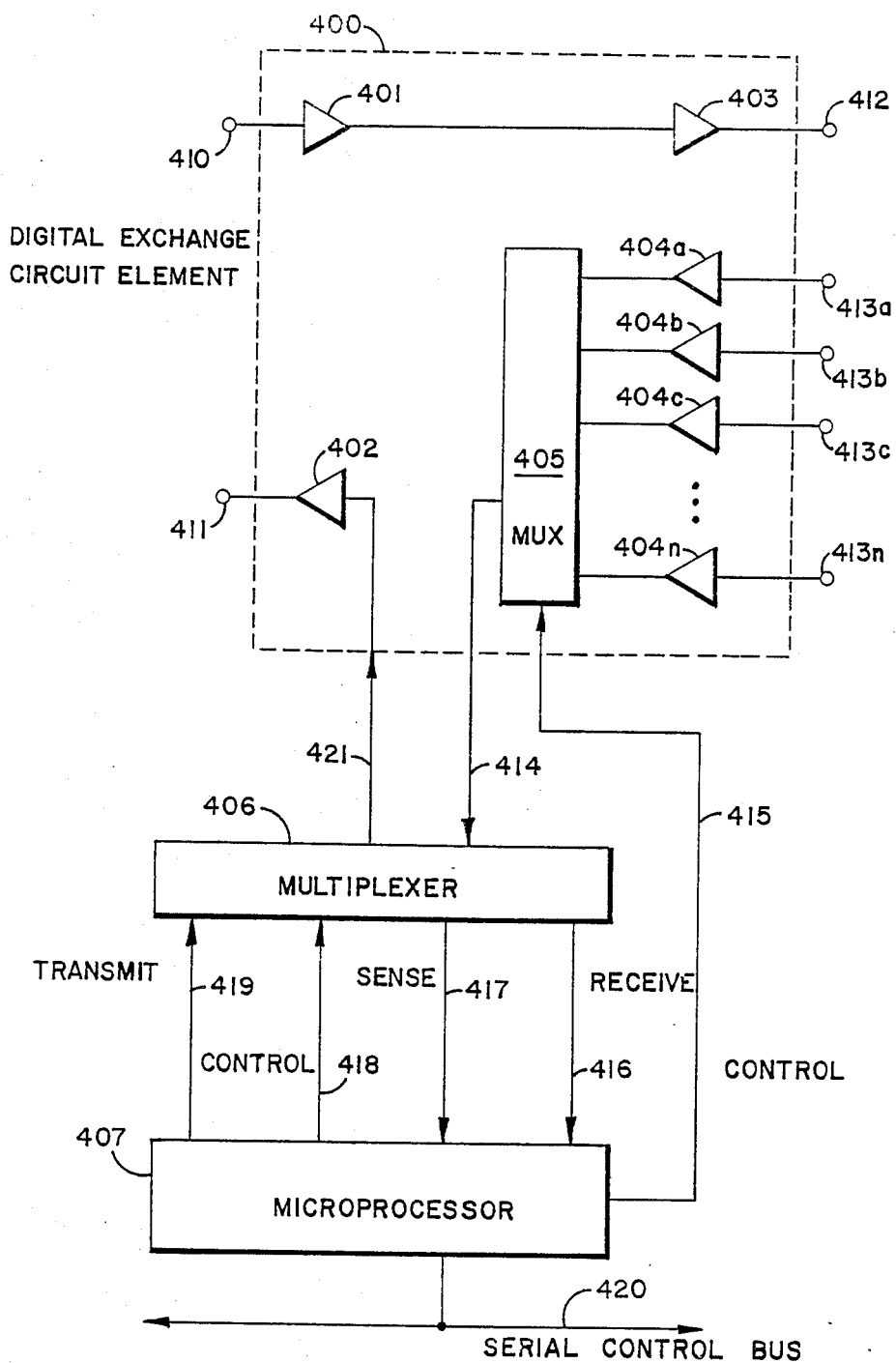
FIG. 14 is a reconstruction of the digital exchange circuit element of FIG. 6 including the control logic necessary to control the switch.

As in standard telecommunications systems, control is the system of listening for user requests and then setting up, maintaining and ultimately releasing connections in response to those user requests. FIG. 14 is a reconstruction of the digital exchange circuit element of FIG. 6 with the control logic included. The N-channel multiplexer 405 is in the preferred embodiment a 64-line to 1-line multiplexer in keeping with the aforementioned discussions describing the preferred embodiment. Connecting line 414 which had connected the output of multiplexer 405 to line driver 402 is now shown driving a second multiplexer 406 under microprocessor control.

The microprocessor 407 is actually an assemblage of chips which includes a processor, program storage and memory chips, various I/O chips for control purposes, and several serial communications channels. The control line 415 is used to operate multiplexer 405 and control line 418 is used to control and operate multiplexer 406. One of the serial communication channels which are an integral part of microprocessor assembly 407 can be inserted under microprocessor control in the circuit connecting multiplexer 405 to line driver 402 by proper manipulation of multiplexer 406. This first serial communication channel from the microprocessor is represented by the transmit line 419 and the receive line 416 connected between multiplexer 406 and microprocessor 407. A second serial communications channel from microprocessor 407 is connected to serial control bus 420. Also shown in FIG. 14 is the sense line 417 connected between multiplexer 406 and microprocessor 407 which is used to determine the mark/space sense of the input from the multiplexer 405.

In the preferred embodiment of the present invention discussed above, there are actually eight digital exchange circuit elements on each digital exchange board. For each digital exchange board, all eight digital exchange circuit elements are controlled and connected to a single multiplexer 406 controlled by a single microprocessor 407 in the same fashion as shown in FIG. 14.

Multiplexer 406 shown in FIG. 14 is also an assemblage of chips. It is a device which is able to connect any or all of the 64-channel muxes (represented by multiplexer 405) on a single exchange board to their respective line drivers (represented by line driver 402). The multiplexer assembly 406 is also able to insert the microprocessor into any one of the eight circuits between multiplexers 405 and line driver 402 in order to effect control.

The essence of the control operation in a simplified form is to select a channel on one of the 64-channel muxes, listen for a request, signal an appropriate correspondent downstream by way of the line driver if a request is received from upstream, then operate multiplexer 406 so as to attach the 64-channel multiplexer 405 directly to the line driver 402. Once a direct connection is completed, the processor is free to select another 64-channel multiplexer on the same digital exchange board and repeat the operation by scanning for requests. The detailed operation of this control structure is described below.

In one of the applications of the preferred embodiment of the present invention, the digital exchange circuit switch may be operated with asynchronous, character-oriented protocols working at a data rate of 16,000 bits per second. Asynchronous communications are typically described as being based upon two signalling levels, one called "mark" and one called "space". Inlets and outlets of the digital exchange switch elements normally rest at a space condition.

A caller or requester gets the attention of the exchange switch by asserting a mark condition at its inlet port. When the microprocessor 407 is ready to listen to a particular port, it will assert a mark condition at the requester's outlet port. When the caller sees the mark condition at the outlet port associated with it, it will submit a dialing string in the form, for example, of a sequence of ASCII characters representing the port the caller wishes to contact. This string will be presented at the inlet port of the calling party. The exchange switch then attempts to complete the connection identified by the dialing string, and if it is able to do so, it sends an acknowledgement string through the outlet port to the calling party.

Once the calling party receives the acknowledgement string, it can assume that it is connected directly to the called party and it no longer has to use the dialing protocol or the dialing speed to communicate with its selected correspondent. In this condition it has a private communications link which can be used in any manner using any protocols. The options are limited to some extent by the method used to sense disconnect, as discussed below.

A call is completed when either party to the call hangs up. This is accomplished by holding the inlet port connection in a space condition for a fixed time interval which is longer than any of the character times permitted on this connection. This method for sensing disconnect prohibits very low speed communications, but this is not considered a significant limitation of the device. Other protocols can be adopted to allow very low speed or analog communications.

Control Structure of Exchange Switch Board

Figure 15:
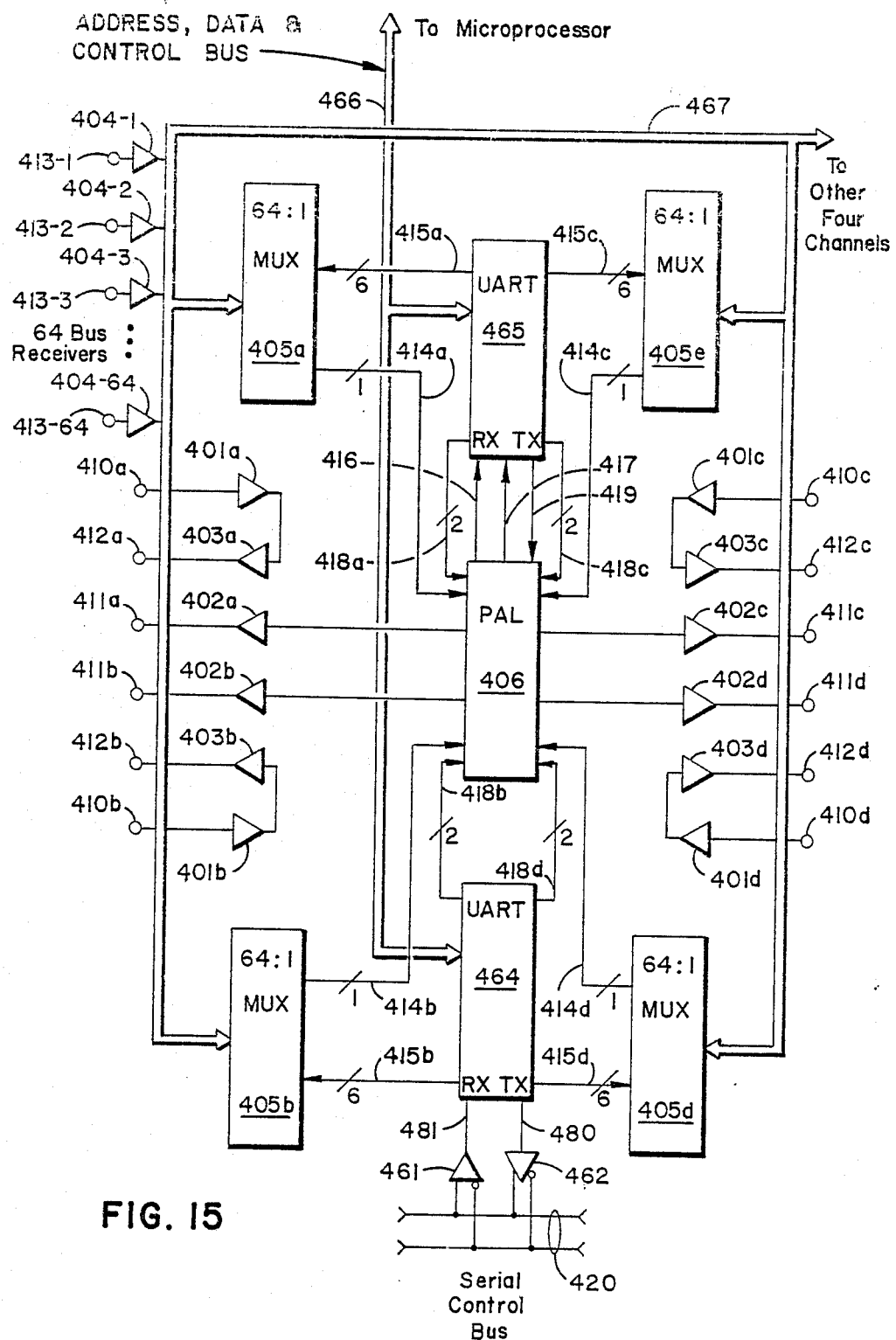
FIG. 15 shows a partial view of the detailed electrical structure of the digital exchange circuit element of FIG. 14.

FIG. 15 describes a partial detailed electrical view of a single switch board of the type described in connection with FIG. 10. FIG. 15 shows the details of the multiplexer and microprocessor structure described above in connection with FIG. 14. Certain economies in implementation are achieved by combining eight digital exchange circuit elements on a single board and eliminating some duplicate functions. For example, the 64 bus receivers 404-1 through 404-64 are used to drive all eight 64-line to 1-line multiplexers 405a-405h on the exchange switch board. The description of the exchange switch board in FIG. 15 does not show the microprocessor assembly 407 so that the description contained in FIG. 15 can be simplified. The microprocessor assembly 407 is connected to the address and data bus 466 shown at the top of FIG. 15. In the preferred embodiment of the present invention, microprocessor assembly 407 is comprised of an Intel 8088 microprocessor with associated RAM and PROM memories. The microprocessor chip also has an Intel 8255 programmable peripheral interface chip connected to it to allow the microprocessor to read the use code on the backplane to determine which stage this microprocessor is operating within and at which location. The Intel 8255 programmable peripheral interface chip is also used to provide operator status lights regarding the operation of the exchange switch. The structure of this microprocessor assembly is easily reconstructed by those skilled in the art, and is not shown.

FIG. 15 shows only one-half of the available eight channels of a digital exchange switch board. The second four channels of the digital exchange switch board would be shown connected to the right of FIG. 15 and attached to the 64-channel communications bus 467. The structure of the contol of the other four channels on the digital exchange switch board described in FIG. 15 would be identical to that shown in FIG. 15 except for one minor difference discussed below.

Four of the eight line inlets of the partial switch board of FIG. 15 are shown as 410a-410d. Those four inlets are buffered by line receivers 401a-401d, buffered through bus drivers 403a-403d and transmitted to the bus driver output connections 412a-412d on the exchange switch board. Four of the available eight line outlets of the exchange switch board shown in FIG. 15 are labeled 411a-411d, which receive their outlet signals from line drivers 402a-402d. These line drivers receive the output signals from the digital exchange switch board from multiplexer 406. In the preferred embodiment of the present invention, multiplexer 406 is actually a programmable array logic (PAL) chip part number PAL20L8 available from National Semiconductor and other vendors. PAL20L8 is a 14-input and 8-output AND/OR array with a programmable AND array and a fixed OR array. It is programmed to provide the switching function under microprocessor control to either allow the 64-line to 1-line multiplexers to be connected to the line driver outlets or allow the microprocessor to be connected to the line driver outlets. PAL 406 is also programmed to allow the microprocessor to listen on any of the channels of the 64-channel communictions bus through any one of the 64-line to 1-line multiplexers.

The microprocessor assembly 407 controls the digital exchange switch board through four universal asynchronous receive/transmit (UART) chips which receive control signals from the microprocessor through address and data bus 466. In the preferred embodiment of the present invention, the UARTs are Intel 8256 universal asynchronous receiver/ transmitter chips available from Intel and other semiconductor vendors. These UARTs feature two 8-bit parallel communications ports and one serial communication port. Six bits of each 8-bit parallel port of the UARTs are used to address and control the 64-line to 1-line multiplexers. The remaining two bits of each 8-bit parallel communication port of each UART are used to address and control the portion of the PAL associated with each communication channel. For example, the six control bits for 64-line to 1-line multiplexer 405a are received from the first 8-bit parallel port of UART 465 through line 415a (lines 415a–415d are actually 6-bit-wide data paths, while lines 418a–418d are 2-bitwide data paths). The control signals for controlling channel 1 of the digital exchange board through PAL 406 are received by the microprocessor along address and data bus 466 through UART 465 along line 418a. The programming function table for the PAL chips is not described, however it is well within those skilled in the art to program such a PAL to implement the functions described herein.

The microprocessor is able to inject itself between the 64-line to 1-line multiplexers and the line drivers with the aid of one of the PAL chips and one of the UARTs. For example, The serial communications channel of UART 465 is used by the microprocessor to receive information from PAL 406 along receive line 416. The microprocessor can also transmit data through the serial communications port of UART 465 along transmit line 419 to PAL 406. Since FIG. 15 depicts only one-half of the control structure for a typical digital exchange switch board, the microprocessor assembly 407 can use two serial communication ports through the two PAL circuits to listen and talk on the switching network.

The microprocessor assembly 407 has need to communicate with other microprocessors in the rack to which it is connected. This communication is accomplished through serial control bus 420 attached to UART 464. In a similar fashion described above, microprocessor assembly 407 controls UART 464 through address and data bus 466 to transmit data through differential line driver 462 onto serial control bus 420 and receive communication and control signals along differential line receiver 461 through the receive port of UART 464. In this fashion, microprocessor assembly 407 can communicate with the other microprocessor assemblies in the rack. A fourth serial communications port is available to the microprocessor assembly 407 through the UART not shown but associated with the other four channels not shown but assumed as part of the digital exchange switch board described in FIG. 15. That fourth serial communication port is used to transmit and receive diagnostic data along a diagnostic bus which is accessible to maintenance personnel for monitoring the operations of the network. Hence, microprocessor assembly 407 has four available serial communications ports, two of which are assigned for listening/talking on the switch exchange network, one assigned to inter-microprocessor communications along the serial control bus 420 and one assigned to a diagnostic bus (not shown).

Microprocessor assembly 407 uses the four UARTs of the digital exchange switch board to constantly scan the 64 channels of the communications bus lines 413-1 through 413-64. The microprocessor accomplishes this scanning by using one of the four available UARTs and one of the free and available 64-line to 1-line multiplexers to sequentially step through each channel of the 64-channel bus and momentarily listening for a mark condition. As the 64-line to 1-line multiplexer is stepped through the 64 channels, the output is passed to the PAL associated with the multiplexer being used by the microprocessor. The PAL will generate an interrupt signal along sense line 417 to the UART being used by the microprocessor for scanning. That UART will transmit the interrupt to the microprocessor assembly 407 alerting it to a request for user of the network.

For example, 64-line to 1-line multiplexer 405a is sequentially stepped through each channel of the 64 channels of the communication bus 467. This stepping is accomplished by control signals along line 415a received by the multiplexer from UART 465. UART 465 receives in turn its control signals from the microprocessor attached to address and data bus 466. The microprocesor assembly 407 is aware of which bus lines are active and currently in use by means of an internal activity table. The microprocessor will therefore only monitor bus channels not currently assigned for activity indicating communications requests. Concurrent with the stepping operation, UART 465 is constantly monitoring the interrupt port attached to sense line 417 for an active channel requesting service. If an active line was found by multiplexer 405a, PAL 406 will alert UART 465 through sense line 417 which in turn will alert microprocessor assembly 407. The microprocessor will stop scanning 405 and record which line was requesting service.

Depending upon which rack the microprocessor is operating in, it will react to a request for service in a different way. The several ways to react are all programmed into the PROM memory of the microprocessor assembly 407 but only the response appropriate to the location will be used. If located in the transfer rack, microprocessor assembly 407 will determine which upstream microprocessor is requesting service (by means of an internal network map) and acknowledge that request by sending the appropriate control signals down address and data bus 466 to UART 464. The serial communications port on UART 464 is used to communicate with the upstream microprocessor through serial control bus 420 to acknowledge the request for service. The microprocessor assembly 407 will then check its activity list internal to its local memory to find an unused line driver outlet on the communication switch board which can be used to forward the request for communications through the network.

If the microprocessor assembly 407 resides on a switch board in the crossover rack (a fact communicated to the microprocessor through the DIP switch use-code on the backplane of the rack), it will respond to a request for service on a bus line only if it can respond on the outlet associated with the bus channel. In this fashion, the upstream microprocessor is alerted through the interstage cables, not through any serial control bus. Assume for the purposes of this crossover stage example that channel 1 of the 64-channel bus is requesting service and that the first channel outlet associated with outlet 411a is not in use and available. The microprocessor assembly 407 will then send the appropriate command and control signals down address and data bus 466 to UART 465 to connect the transmit line of the serial communications port of UART 465 to outlet 411a through PAL 406. UART 465 will then send the appropriate control and command signals along line 418a to PAL 406 instructing it to connect serial port transmit line 419 from UART 465 to the output of PAL 406 which is attached to the input to line driver 402a. When this connection has been made, UART 465 will assert a mark condition on the transmit line of its serial port connected to line 419 which will be in turn asserted on the output of channel 1 associated with line 411a. This mark condition signals the upstream exchange switch board that a communications path through the network is completed to this point.

As previously mentioned, depending on where the microprocessor switchboard is located within the exchange switching network, the exact sequence of events for handling the dialing string for a call may also vary between stages. For example, the microprocessor assembly 407 may be required to forward the incoming communications request from the 64-channel bus to a particular line driver outlet to forward the call to a specific destination. In that case, the microprocessor would need to listen and record a dialing string from the requesting channel of the 64-channel bus in order to forward the call to the proper destination. For example, in receiving the dialing string from one channel within the 64-channel bus, microprocessor assembly 407 would send the appropriate command and control signals down address and data bus 466 to UART 465 to instruct PAL 406 to receive the dialing string from multiplexer 405a and to forward it along the receive line 416 of the serial communications port of UART 465. UART 465 would send the appropriate command and control signals in response to the microprocessor's commands along control line 418a to PAL 406, which would in response to these control signals connect output 414a of multiplexer 405a to receive line 416 connected to the serial communications port of UART 465. UART 465 would also ensure that multiplexer 405a has selected and held the appropriate channel of the 64-channel bus by sending the appropriate command and control signals along line 415a. In this fashion, the dialing string may be received by UART 465 through the serial communications port and forwarded in a parallel fashion to the microprocessor assembly 407 along address and data bus 466. The microprocessor assembly 407 would then analyze the dialing string and determine which of its eight communications outlets is the appropriate outlet to use to forward this call. In some situations it may be impossible for the microprocessor assembly 407 of the switch board to forward the call through the appropriate channel either because the channel is currently busy, unavailable due to failure, or the desired connection is simply unavailable through this switch board. Depending upon the location of this particular switch board within the commuications network, the microprocessor assembly 407 may be required to respond to the upstream microprocessor either by sending the appropriate response signals along the serial control bus 420, forwarding a mark signal along one of the eight outlets available to it, or by simply not responding to the request in the first place due to the impossibility of completing the request.

It will be understood by those skilled in the art that the microprocessor assembly 407 may use any one of the eight available 64-line to 1-line multiplexers on the switch board for scanning and monitoring the 64-channel bus. These eight 64-line to 1-line multiplexers are available through the four USARTs on the switch board. The microprocessor assembly 407 is able to monitor any one of the 64 channels on the 64-channel bus through the serial communications ports attached to any one of the two PAL circuits. The parallel communication ports of the four UARTs are used to control the multiplexers and the PAL circuits.

The aforementioned description of the electrical components of the exchange switch board is not limited to the specific components described. Those skilled in the art will recognize that a wide variety of semiconductor components may be used to implement the control and switching functions of the exchange switch board without departing from the spirit and scope of the present invention. All of the components of the exchange switch board could be combined into VLSI components to accomplish the same function as long as a sufficient number of pins were available for I/O and control. For example, application-specific integrated circuits (ASIC) may be used where the multiplexers, PAL chips, UARTs, RAM, PROM and microprocessor are all combined onto a single die by a semiconductor manufacturer according to the specifications described above. Such ASICs are now available from semiconductor manufacturers in package sizes sufficient to provide enough pinout to reduce the overall size of the digital exchange switch board to that of an integrated circuit. It is manufestly intended that the disclosure of the present invention and the claims cover MSI, LSI, VLSI and ASIC implementations of the present invention.

Call Routing Control

It has been described how a caller gets the attention of the exchange switch, how a caller submits it routing request in the form of a dialing string, and how the correspondents conclude a call. The exchange switch automatically handles the routing of the call through the digital exchange network. The routing problem can take two forms. The first is a trivial problem in the case of a single stage exchange switch, as was previously discussed. The more complicated and challenging problem is in the case of a three-stage exchange switch. In the simple case of a single-stage exchange switch like the one shown in FIG. 11, there is one and only one path between two correspondents, and that path is known to every microprocessor in the rack. If the called port is on the same exchange switch board as the calling port, then the single microprocessor on the exchange board can complete the call by switching two of the 64-channel muxes appropriately. If the called port is on a different exchange switch board from the calling port, then two microprocessors will be involved in the switching, one on the calling board and one on the called board. These two microprocessors can easily negotiate their actions by way of messages sent over the serial bus 420 which links all of the microcomputers in the rack.

The routing situation for the microprocessors in a three-staged exchange switch is somewhat more complicated, and there are a number of possible solutions to the route problem. Generally, the solution is based on the fact that the microprocessor on each exchange switch board is able to act as a caller to the exchange switch board which is downstream from it.

Referring to FIG. 13, it is important at the outset to understand that each one of the eight microprocessors within each individual I/O rack can communicate with any one of the other eight microprocessors through the serial control bus. The serial control bus for each I/O rack is also connected to the serial control bus for the adjacent transfer stage rack. Thus, any one of the eight microprocessors in I/O rack 600a can communicate via the serial control bus with any one of the eight microprocessors within adjacent transfer rack 600b. Inter-rack communication with other I/O rack/transfer rack pairs is not possible. Thus, communication by serial control bus is not possible between I/O rack 600a and I/O rack 600d. Each of the crossover racks also contains a serial control bus which links each one of the eight microprocessors within each crossover rack with any one of the other microprocessors in the same rack via a serial control bus. However, a microprocessor in any one of the crossover racks has no way to communicate to any of the other microprocessors in any other crossover rack. For example, one of the eight microprocessors in crossover rack 600c has no direct line of communication with any one of the other microprocessors in crossover rack 600f. Also, there is no direct link of serial communication between the transfer racks and the crossover racks. Any handshaking protocol that is required for communication must be carried on via the interstage cabling pairs linking the transfer racks to the crossover racks.

The progress of a request for communications through the switching network of FIG. 13 is handled as follows. We will assume for the purposes of this example that a caller at port 1 is attempting to reach the destination (called party) at port 4,034, which is the second port in the 64th I/O rack 600g of FIG. 13. The caller at port 1 asserts a mark condition on the inlet of port 1 which then appears on the associated bus line of the transfer stage bus. Any one of the eight microprocessors in the 64-channel transfer rack 600b can elect to handle the call if it has an available channel to the crossover rack. An electing microprocessor first looks at an internal table stored in local memory to check its activity list as to whether it has a non-busy channel to the crossover stage. Assuming the electing microprocessor has an available channel, it will send a message along the serial control bus to the I/O rack microprocessor associated with port 1 to request the job of handling the communication call. Several microprocessors within the transfer rack 600b may elect to handle the call, but only the first transfer stage microprocessor to respond to the I/O microprocessor associated with port 1 will be granted the job of handling the call. This microprocessor will acknowledge the first electing microprocessor and refuse all subsequent requests for the job.

The serial communications bus linking the microprocessors in the I/O rack and the transfer rack uses a carrier sense multiple access/collision detection (CSMA/CD) networking protocol. This serial communications bus is likened to a party line where the first user to request access to the bus is granted access and all other microprocessors attached to the bus must wait for the first user to relinquish control of the bus.

Although the microprocessors within transfer rack 600b may communicate via the serial control bus to any of the microprocessors in I/O rack 600a, there exists no direct serial communication path between the microprocessors of the transfer racks and the crossover racks. Therefore, a communication request must be placed with a crossover rack in a manner similar to that in which the user at port 1 placed a communication request to the I/O rack. We shall assume for the purposes of this example that the electing microprocessor in transfer rack 600b has selected channel 2 of transfer rack 600b for communication to the crossover stage. Channel 2 is represented in FIG. 13 as the cable pair 603, 604, which is connected to channel 65 of the crossover stage (the first channel of the second crossover rack 600f). The electing microprocessor controlling channel 2 within transfer rack 600b asserts a mark condition on interstage cable 603 which is sent to crossover rack 600f. This mark condition is received at channel 65 and placed on the first bus channel within the crossover stage bus of crossover rack 600f. Only the microprocessor associated with channel 65 of the crossover stage (channel 1 of crossover rack 600f) can answer the request, since only one microprocessor in the rack is capable of responding along return line 604 to the electing microprocessor in transfer rack 600b. The responding microprocessor in crossover rack 600f associated with crossover stage channel 65 answers by sending a mark condition back on return line 604 which is forwarded directly through the transfer stage of transfer rack 600b to the I/O bus of I/O rack 600a and placed on the appropriate bus line associated with channel 2 of transfer rack 600b. The microprocessor in I/O rack 600a associated with port 1 monitors channel 2 of the I/O bus for a mark signal indicating a closed loop with the crossover rack. The I/O rack microprocessor was previously alerted to monitor channel 2 of the I/O bus by the electing transfer stage microprocessor in transfer rack 600b when that microprocessor alerted the I/O microprocessor as to its election to handle the call. At that time, the transfer rack microprocessor had told the I/O rack microprocessor via the serial control bus that it would attempt to connect the call through channel 2 between the transfer rack and crossover rack.

The microprocessor within I/O rack 600a associated with port 1 forwards the mark condition found on channel 2 of the 64-channel I/O bus to the outlet of port 1, which is an indication to the user that it should proceed to dial (transmit the requested destination address) the called party. The user connected to port 1 dials the address of the destination by transmitting a short string of ASCII characters. In this example, we are attempting to connect to I/O port 4,034. The user of port 1 would therefore transmit STX 4034, which is a four-character ASCII transmittal address preceded by the ASCII control code STX (start of text). This dialing string is transmitted through the electing transfer stage microprocessor and is received by the responding crossover stage microprocessor in crossover rack 600f. The dialing string is received by the latter microprocessor and analyzed for determining a path to the destination. This microprocessor (connected to channel 65 of the crossover stage in crossover rack 600f) checks its internal connection list to see if it has access through one of its other seven channels to the destination transfer rack required to complete the call. In this particular case, this particular microprocessor does not have access through to one of its controlled ports to the required transfer rack. In fact, only the eighth microprocessor in crossover rack 600f has access through channel 128 of the crossover stage to transfer rack 600h.

Since addess to the required transfer rack is only available through another microprocessor in rack 600f, the first microprocessor in crossover rack 600f associated with channel 65 must request that the call be completed by the eighth microprocessor in crossover rack 600f associated with channel 128. This request is made via the internal serial communications bus which links all eight of the microprocessors in crossover rack 600f. The eighth microprocessor receives the request along the serial bus along with the dialing string and checks its internal activity list to see if channel 128 is available for communication. If the eighth microprocessor of crossover rack 600f finds that channel 128 connecting to transfer rack 600h is busy or otherwise unavailable (due to hardware failure), the eighth microprocessor communicates a blocking message to the first microprocessor in crossover rack 600f, which informs it that the call cannot be completed through channel 128. At this point, the eighth microprocessor drops its communication path via the serial communications bus with the first microprocessor. The first microprocessor associated with channel 65 of crossover rack 600f communicates the blocking message along return path 604 to channel 2 of transfer rack 600b. As soon as the blocking message is transmitted to the transfer rack, the first microprocessor of crossover rack 600f associated with channel 65 drops its communication link to the transfer rack and is free to handle other communication requests. The blocking message on channel 2 of transfer rack 600b is immediately placed on the associated bus wire of the I/O stage bus of I/O rack 600a where it is received by the microprocessor associated with port 1. At this point, the microprocessor associated with port 1 is alerted that the electing microprocessor in transfer rack 600b has attempted to complete the call through a blocked path through the network. This microprocessor alerts the electing microprocessor via the serial communications bus that channel 2 is a blocked path out of transfer rack 600b. The electing microprocessor of transfer rack 600b must therefore attempt to find an alternate path to the destination to complete the call.

The electing microprocessor in transfer rack 600b keeps a history of the calling attempts through the network so that it does not duplicate an attempt through the same blocked path. If the electing microprocessor in transfer rack 600b has another channel to crossover rack which is not busy or otherwise unavailable (each microprocessor has eight inlet/outlet pairs connected to eight crossover racks in the crossover stage), it will attempt to complete the call through one of the other crossover racks. If the electing microprocessor associated with channels 1-8 of transfer rack 600b does not have any available channels to forward the call, then it hands off to another microprocessor within the same transfer rack 600b in an attempt to complete the call. The hand-off or transfer microprocessor calls on the serial bus requesting that another microprocessor complete the call. The message calling for the hand-off includes the history of the blocked paths plus a time stamp to keep the new microprocessor from trying the same blocked paths and to keep the old microprocessor from picking up a transfer should a later microprocessor also be unable to complete the call. This hand-off procedure continues until a path to the destination is found or until all available paths out of transfer rack 600b are exhausted and no unblocked path can be found.

Referring back to the point mentioned above wherein the call had been completed through as far as the first microprocessor associated with channel 65 of crossover rack 600f, that microprocessor attempted to place the call through the eighth microprocessor associated with channel 128 within crossover rack 600f. Assume for purposes of this continuing example that channel 128 to transfer rack 600h was not blocked and is available for communication. If the eighth microprocessor of crossover rack 600f finds channel 128 free, it sends a message back to the first microprocessor of transfer rack 600f associated with channel 65 that it can complete the call as far as transfer rack 600h.

The eighth microprocessor in crossover rack 600f does not have a direct means of communication with any of the microprocessors within transfer rack 600h or I/O rack 600g. The only means of communication are over the communications line cable pair 615, 616. In this situation, the eighth microprocessor of crossover rack 600f will attempt to complete the call using a similar protocol used by the user in attempting to place a call through port 1 and using the same procedure that the electing microprocessor in transfer rack 600b used to communicate to the first microprocessor in crossover rack 600f. That means is to place a mark condition on line 616 of channel 128 exiting crossover rack 600f which is received at inlet port 4,034 of transfer rack 600h. This mark condition is placed on the associated bus wire on the I/O stage bus of I/O rack 600g. This mark condition signifies a request for service which is picked up by one of the eight microprocessors found in I/O rack 600g. This receiving microprocessor does not know the desired destination port of the communications request, but merely picks up the call to aid its completion. The receiving microprocessor in I/O rack 600g alerts the microprocessor assigned to control inlet/outlet pair 4,034 in transfer rack 600h that an attempt at communication has been received. The microprocessor in transfer rack 600h associated with channel 4,034 returns a mark condition on line 615 which is received at channel 128 of crossover rack 600f. The eighth microprocessor of crossover rack 600f receives the mark condition on the return line and promptly transmits the dialing string on the outlet line 616 of channel 128. The dialing string is received on channel 4,034 of the transfer rack and placed on the associated bus line of the I/O stage bus of I/O rack 600g where it is picked up by the receiving microprocessor. If the receiving microprocessor does not have direct control over the destination port, it cannot complete the call without the aid of the microprocessor which has control over the destination. In this case, assume for example that the eighth microprocessor in I/O rack 600g is the receiving microprocessor. This microprocessor does not have direct control over destination port 4,034. Therefore, the receiving microprocessor must contact the microprocessor that controls port 4,034 via the serial control bus. The receiving microprocessor communicates with the control microprocessor of port 4,034 to complete the call. The receiving microprocessor then transfers control of the call and drops off the line, free to handle other requests.

If destination port 4,034 is busy, the control microprocessor associated with that port in I/O rack 600g transmits a busy signal to the microprocessor in transfer rack 600h associated with channel 4,034 which is connected to channel 128 of crossover rack 600f. The microprocessor controlling port 4,034 then drops offline after transmitting a busy signal, freeing itself for other requests. The microprocessor in transfer rack 600h which is associated with channel 4,034 also forwards the busy signal onto channel 128 of crossover rack 600f and promptly drops off-line, freeing itself to handle other requests. The eighth microprocessor of crossover rack 600f associated with channel 128 forwards the busy signal via the serial communications bus to the first microprocessor in crossover rack 600f and promptly drops off-line, freeing itself for other requests. The first microprocessor in crossover rack 600f associated with channel 65 which is connected to channel 2 of transfer rack 600b forwards the busy signal and promptly drops off-line, freeing itself for other requests. The busy signal is placed on the associated bus line of the I/O stage bus of I/O rack 600a, where it is received by the microprocessor associated with port 1. This microprocessor forwards the busy signal to both the electing microprocessor in transfer rack 600b which was handling a call and to the user connected to port 1, informing both that the call cannot be completed due to destination port 4,034 being already in use. The user connected to port 1 is therefore instructed to hang up and try again later. Both the microprocessor in I/O rack 600a associated with port 1 and the electing microprocessor of transfer rack 600b promptly drop offline and free themselves for handling other communications requests.

If port 4,034 was not busy when the attempted communication was forwarded to the control microprocessor associated with port 4,034, a direct connection is completed from port 1 to port 4,034. All the microprocessors down the line receive a completion message through the communication path, and all the microprocessors then switch the multiplexers to direct connections so that direct communication can be effected along the line. The microprocessors all drop off-line and are then free to handle other communications requests.

Communication is terminated between the users at port 1 and port 4,034 by placing a space signal (equivalent to a TTY break signal) on the line. Either port 1 or port 4,034 may "hang up" by placing the space condition on its associated inlet. All the microprocessors along the communication path periodically monitor the communication path for the space signal. As the space signal is received by the polling microprocessors down the communication path, the microprocessors switch the multiplexers to break the communication path and free the multiplexers for other communications requests. The individual links along the communication path from port 1 to port 4,034 will individually drop out of the path as the microprocessors become aware of the space condition on the line. (NOTE: An open communication path is equivalent to a space condition.)

One of the great advantages of the preferred embodiment of the present invention disclosed herein is the fact that the processing power is distributed throughout the switch in such a way that as the device is made larger due to its modular design, the number of microprocessors available to handle calls increases proportionately. It should also be noted that the exchange switch does not have to operate in a self-directed fashion like that described above. It would also be possible to bring the instructions for operating the switch in through one of the user ports and to distribute those instructions throughout the exchange switch by way of microprocessor-to-microprocessor messaging such as through the use of the serial control bus. Thus, it would also be possible to have an external computer direct the operations of the switch and thereby remove from the callers the burden of dialing.

Although specific logic configurations and electrical configurations have been illustrated and described for the preferred embodiment of the communications exchange switch set forth herein, it will be appreciated by those of ordinary skill in the art that any conventional logic or electrical arrangements which are calculated to achieve the same purpose may be substituted for the specific functional configurations shown. Thus, although conventionally available SSI and MSI logic is generally preferred due to its availability for implementation of the exchange switch, the logic described herein for the entire network may be implemented through the use of discrete components or it may all be combined to a greater or lesser degree in a fewer number of LSI or VLSI components. In addition, it will be readily appreciated by those of ordinary skill in the art that although digital logic conventions have been here employed for the communication messages, analog signal conventions may be alternatively utilized as the communications message transfers throughout the exchange switch.

While the present invention has been described in connection with the preferred embodiment thereof, it will be understood that many modifications will be readily apparent to those of ordinary skill in the art, and this application is intended to cover any adaptations or variations thereof. Therefore, it is manifestly intended that this invention be limited only by the claims and the equivalents thereof.

What is claimed is:

1. A single-stage multi-channel space-division switching network, comprising:
   a plurality of I/O ports, each of which having inlet and outlet means adaptable for connecting to telecommunications equipment;
   a bus having a plurality of channels, each of which being driven by a unique one of said inlet means of said I/O ports;
   a plurality of selection means each having as inputs a plurality of said channels of said bus and each having an output which drives one of said outlet means of said I/O ports, said selection means controllable for causing one of said channels of said bus to be connected to said output of said selection means; and
   a control means connected to each of said selection means for sensing communications requests from a requesting one of said I/O ports for access to a requested one of said I/O ports and for causing in response thereto at least one of said selection means to connect the requesting I/O port to the requested I/O port.

2. A multi-stage multi-channel space-division switching network, comprising:
   I/O stage having a plurality of I/O ports, each of which having inlet and outlet means for connecting to telecommunications equipment;
   I/O bus having a plurality of channels;
   a plurality of I/O selection means, each having as inputs a plurality of said channels of said I/O bus and each having an output which drives one of said outlet means of said I/O ports of said I/O stage, said I/O selection means controllable for causing one of said channels of said I/O bus to be connected to said output of said selection means;

a transfer stage having a plurality of transfer ports, each of which having inlet and outlet means for transferring communication information;

transfer bus having a plurality of channels, each of which being driven by one of said inlet means of said I/O ports of said I/O stage;

each of said channels of said I/O bus being driven by one of said inlet means of said transfer ports of said transfer stage;

a plurality of transfer selection means, each having as inputs a plurality of said channels of said transfer bus and each having a single output which drives one of said outlet means of said transfer ports of said transfer stage, said transfer selection means controllable for causing one of said channels of said transfer bus to be connected to said output of said transfer selection means;

a crossover stage having a plurality of crossover ports, each of which having inlet and outlet means for transferring communication information;

a crossover bus having a plurality of channels, each of which being driven by one of said inlet means of said crossover ports of said crossover stage;

a plurality of crossover selection means, each having as inputs a plurality of said channels of said crossover bus and each having an output which drives one of said outlet means of said crossover ports of said crossover stage, said crossover selection means controllable for causing one of said channels of said crossover bus to be connected to said output of said crossover selection means;

each of said outlet means of said transfer ports of said transfer stage being connected to one of said inlet means of said crossover ports of said crossover stage;

each of said outlet means of said crossover ports of said crossover stage being connected to one of said inlet means of said transfer ports of said transfer stage; and a control means connected to said plurality of I/O selection means, said plurality of transfer selection means and said plurality of crossover selection means for receiving communications requests from one of said I/O ports for access to another of said I/O ports and for causing a response thereto, said selection means to connect said ports.

3. A multi-stage multi-channel space division switching network, comprising:

I/O stage having a plurality of I/O units, each I/O unit comprising:

a plurality of I/O ports having inlet and outlet means for connecting to telecommunications equipment;

I/O bus having a plurality of channels; and a plurality of I/O selection means, each having as inputs a plurality of said channels of said I/O bus and each having an output which drive one of said outlet means of said I/O ports, said I/O selection means controllable for causing one of said channels of said I/O bus to be connected to said output of said I/O selection means;

a transfer stage having a plurality of transfer units, each transfer unit comprising:

a plurality of transfer ports having inlet and outlet means for transferring communication information;

a transfer bus having a plurality of channels;

a plurality of transfer selection means, each having as inputs a plurality of said channels of said transfer bus and each having an output which drives one of said outlet means of said transfer ports, said transfer selection means controllable for causing one of said channels of said transfer bus to be connected to said output of said transfer selection means;

a crossover stage having a plurality of crossover units, each crossover unit comprising:

a plurality of crossover ports having inlet and outlet means for transferring communication information;

a crossover bus having a plurality of channels;

a plurality of crossover selection means, each having as inputs a plurality of channels of said crossover bus and each having an output which drives one of said outlet means of said crossover ports, said crossover selection means controllable for causing one of said channels of said crossover bus to be connected to said output of said crossover selection means;

each of said channels of said I/O bus of each of said units of said I/O stage being driven by one of said inlet means of one of said transfer ports of one of said units of said transfer stage;

each of said channels of said transfer bus of each of said units of said transfer stage being driven by one of said inlet means of one of said I/O ports of one of said units of said I/O stage;

each of said channels of said crossover bus of each of said units of said crossover stage being driven by one of said inlet means of one of said crossover ports of one of said units of said crossover stage;

each of said outlet means of each of said transfer ports of each of said units of said transfer stage being connected to one of said inlet means of one of said crossover ports of one of said units of said crossover stage;

each of said outlet means of each of said crossover ports of each of said units of said crossover stage being connected to one of said inlet means of one of said transfer ports of one of said units of said transfer stage; and control means connected to said I/O selection means, said transfer selection means and said crossover selection means for receiving communications requests from one of said I/O ports for access to another of said I/O ports and causing in response thereto said I/O selection means, said transfer selection means and said crossover selection means to connect said ports.

4. A single-stage space-division switching network, comprising:

a plurality of I/O ports, each having an inlet and an outlet;

a plurality of bus drivers, each having an input connected to one of said I/O port inlets;

a bus having a plurality of channels, each of which being driven by one of said bus drivers;

a plurality of multiplexers, each of which having as inputs a plurality of said channels of said bus and each of which having an output connected to one of said I/O port outlets; and control means attached to said plurality of multiplexers for effecting connections between said I/O ports.

5. The switching network of claim 4 wherein said control means comprises at least one programmed microprocessor operable for sensing communications requests on each inlet of each of said I/O ports and connecting said inlet of said I/O port to one of said outlets of said I/O port in response to said communications request.

6. A multi-stage space-division switching network, comprising:
an I/O stage having a plurality of user ports, each of which having an inlet connected to a bus driver and an outlet connected to the output of a bus multiplexer;
an I/O bus having a plurality of channels, each of which being connected to a separate input to each of said bus multiplexer of each of said user ports of said I/O stage;
a transfer stage having a plurality of signal ports, each of which having an inlet connected to a bus driver and an outlet connected to the output of a bus multiplexer;
a transfer bus having a plurality of channels each of which being connected to a separate input to each of said bus multiplexer of each of said signal ports of said transfer stage;
a crossover stage having a plurality of access ports each of which having an inlet connected to a bus driver and an outlet connected to the output of a bus multiplexer;
a crossover bus having a plurality of channels, each of which being connected to a separate input to each of said bus multiplexer of each of said access ports of said crossover stage;
each of said bus driver of each of said user ports of said I/O stage being connected to a separate channel of said transfer bus;
each of said bus driver of each of said signal ports of said transfer stage being connected to a separate channel of said I/O bus;
each of said bus driver of each of said access ports of said crossover stage being connected to a separate channel of said crossover bus;
each of said outlet of said signal ports of said transfer stage being connected to one of said inlet of said access ports of said crossover stage;
each of said outlet of said access ports of said crossover stage being connected to one of said inlet of said signal ports of said transfer stage; and
a control means attached to all of said multiplexers for effecting communication paths between said I/O ports.

7. The switching network of claim 6 wherein said control means comprises at least one programmed microprocessor operable for sensing communications requests on each inlet of each of said I/O ports and connecting said inlet of said I/O port to one of said outlets of said I/O port in response to said communications request.

8. A single-stage space-division switching network, comprising:
a plurality of space-division switching elements, each comprising:
a signal inlet;
a bus outlet connected to said signal inlet through at least one buffer;
a signal outlet;
a multiplexer having an output connected to said signal outlet and having a plurality of inputs available to be individually selected for connection to said output;
a plurality of bus inlets each of which being individually connected to each of said multiplexer inputs;
means attached to said multiplexer for receiving control signals and for selecting in response thereto one of said multiplexer inputs for connection to said multiplexer output;
a bus having a plurality of channels each of which being individually connected to said bus outlet of one of said space-division switches;
each channel of said bus further connected to a separate one of said bus inlets on a plurality of said space-division switching elements; and
control means attached to each of said means for receiving control signals for controlling the connection of one of said bus inlets to said signal outlet for each of said space-division switching elements.

9. The switching network of claim 8 wherein said control means further includes:
at least one control multiplexer connected between said output of each of said first-named multiplexers and each of said signal outlets;
at least one programmed microprocessor connected to each of said means for receiving control signals operable for causing one of said inputs of each of said first multiplexers to be connected to the output of each of said multiplexers; and
said programmed microprocessor further connected to said control multiplexer and further operable for (1) sensing communications requests on said output of each of said first multiplexers, (2) for causing said communications request to be passed to each of said signal outlets, and (3) for connecting and disconnecting a communications path from one of said bus inlets to said signal outlet on each of said space-division switching elements in response to said communications requests.

10. A multi-stage space-division switching network, comprising:
an I/O stage;
a transfer stage;
a crossover stage;
each of said stages having a plurality of space-division switching elements, each switching element comprising:
a signal inlet;
a bus outlet connected to said signal inlet through at least one buffer;
a signal outlet;
a multiplexer having an output connected to said signal outlet and having a plurality of inputs available to be individually selected for connection to said output;
a plurality of bus inlets each of which being individually connected to each of said multiplexer inputs;
means attached to said multiplexer for receiving control signals and for selecting in response thereto one of said multiplexer inputs for connection to said multiplexer output;
an I/O bus having a plurality of channels, each of which being separately assigned and connected to said bus outlet of one of said space-division switching elements within said transfer stage, each channel of said I/O bus further connected to a separate one of said bus inlets on all of said space-division switching elements within said I/O stage;

a transfer bus having a plurality of channels, each of which being separately assigned and connected to said bus outlet of one of said space-division switching elements within said I/O stage, each channel of said transfer bus further connected to a separate one of said bus inlets on all of said space-division switching elements within said transfer stage;

a crossover bus having a plurality of channels, each of which being separately assigned and connected to said bus outlet of one of said space-division switching elements within said crossover stage, each channel of said crossover bus further connected to a separate one of said bus inlets on all of said space-division switching elements within said crossover stage;

each of said signal outlet of each of said space-division switching elements within said transfer stage being individually connected to each of said signal inlet of each of said space-division switching elements within said crossover stage and each of said signal outlet of each of said space-division switching elements within said crossover stage being individually connected to each of said signal inlet of each of said space-division switching elements within said transfer stage; and control means attached to each of said means for receiving control signals for controlling the connection of one of said bus inlets to said signal outlet for each of said space-division switching elements.

11. The switching network of claim 10 wherein said control means further includes:

at least one programmed microprocessor connected to each of said means for receiving control signals and operable for (1) sensing communications requests on said bus inlets to each of said space-division switching elements, (2) causing said communications requests to be passed to said signal outlet on each of said space-division switching element, (3) connecting and disconnecting a communications path from one of said bus inlets to said signal outlet on each of said space-division switching elements in response to said communications requests.

12. The switching network of claim 11 wherein said control means further includes a plurality of microprocessors distributed throughout the network and connected to individual ones of said space-division switching elements, and a serial control bus connected to each individual microprocessor and operable for exchanging switching information to effect communications connections through said network.

13. The switching network of claim 10 wherein a portion of said channels of said I/O bus is separately assigned and connected to said bus outlet of a portion of said space-division switching elements within said I/O stage.

14. A multi-stage space-division switching network, comprising:

an I/O stage having a plurality of I/O units;
a transfer stage having a plurality of transfer units;
a crossover stage having a plurality of crossover units;
each of said units having a plurality of space-division switching elements, each switching element comprising:

a signal inlet;
a bus outlet connected to said signal inlet through at least one buffer;
a signal outlet;
a multiplexer having an output connected to said signal outlet and having a plurality of inputs available to be individually selected for connection to said output;
a plurality of bus inlets each of which being individually connected to each of said multiplexer inputs;
means attached to said multiplexer for receiving control signals and for selecting in response thereto one of said multiplexer inputs for connection to said multiplexer output;

each of said units having at least one bus having a plurality of channels each of which being connected to a separate one of said bus inlets on all of said space-division switching elements within said unit;

each of said bus outlet of each of said space-division switching elements within each of said units of said I/O stage being individually connected to one of said channels of said bus within said units of said transfer stage;

each of said bus outlet of each of said space-division switching elements within each of said units of said transfer stage being individually connected to one of said channels of said bus within said units of said I/O stage;

each of said bus outlet of each of said space-division switching elements within each of said units of said crossover stage being individually connected to one of said channels of said bus within said unit of said crossover stage;

each of said signal outlet of each of said space-division switching elements within each of said units of said transfer stage being individually connected to one of said signal inlet of one of said space-division switching elements within said units of said crossover stage and each of said signal outlet of each of said space-division switching elements within each of said units of said crossover stage being individually connected to one of said signal inlet of one of said space-division switching elements within one of said units of said transfer stage such that each unit within said transfer stage has at least one signal inlet and at least one signal outlet connected to each unit of said crossover stage; and control means attached to each of said means for receiving control signals and operable for controlling the connection of one of said bus inlets to said signal outlet for each of said space-division switching elements.

15. The switching network of claim 14 wherein said control means further includes:

at least one programmed microprocessor connected to each of said means for receiving control signals and operable for (1) sensing communications requests on said bus inlets to each of said space-division switching elements, (2) for causing said communications requests to be passed to said signal outlet on each of said space-division switching element, (3) for connecting and disconnecting a communications path from one of said bus inlets to said signal outlet on each of said space-division switching elements in response to said communications requests.

16. The switching network of claim 14 wherein said control means further includes a plurality of microprocessors distributed throughout the network and connected to individual ones of said space-division switching elements, and a serial control bus connected to each individual microprocessor and operable for exchanging switching information to effect communications connections through said network.

17. A method of space-division switching comprising the steps of:
   (a) receiving a request for a communications connection from a requesting one of a plurality of source ports to a requested one of a plurality of destination ports;
   (b) placing the request on at least one channel of at least one multi-channel bus;
   (c) monitoring for requests on all channels of the multi-channel bus at each of the plurality of destination ports;
   (d) selecting at a selecting destination port the bus channel on which the request was placed;
   (e) completing a communications connection from the requesting source port to the requested destination port if the location of the selecting destination port corresponds to the location of the requested destination port; and
   (f) forwarding the request to the requested destination port and completing the communications connection from the requesting source port if the location of the selecting destination port does not correspond to the location of the requested destination port.

18. The method of claim 17 wherein step (d) further includes acknowledging the request and receiving from the requesting source port a destination address corresponding to the location of the requested destination port.

19. A method of multi-stage space-division switching, comprising the steps of:
   (a) receiving a request for a communications connection from a requesting one of a plurality of source ports to a requested one of a plurality of destination ports;
   (b) placing the request on at least one channel of a multi-channel transfer stage bus;
   (c) monitoring for requests on all channels of the transfer stage bus at each of a plurality of transfer stations;
   (d) selecting at a selecting transfer station the transfer stage bus channel on which the request was placed;
   (e) forwarding the request for a communications connection from the selecting transfer station and placing the request on at least one channel of a multi-channel crossover stage bus;
   (f) monitoring for requests on all channels of the crossover stage bus at each of a plurality of crossover stations;
   (g) selecting at a selecting crossover station the crossover stage bus channel on which the request was placed;
   (h) forwarding the request for a communications connection from the selecting crossover station and placing the request on at least one channel of a multi-channel I/O stage bus;
   (i) monitoring for requests on all channels of the I/O stage bus at each of a plurality of I/O stations;
   (j) selecting at a selecting I/O station the I/O stage bus channel on which the request was placed;
   (k) completing a communications connection from the requesting source port to the requested destination port if the location of the selecting I/O station corresponds to the location of the requested destination port; and
   (l) forwarding the request to the requested destination port and completing the communications connection from the requesting source port if the location of selecting I/O station does not correspond to the location of the requested destination port.

20. The method according to claim 19 wherein steps (d), (g) and (j) each further includes acknowledging the request and receiving at the respective selecting station a destination address corresponding to the location of the requested destination port.

* * * * *